US007605776B2

United States Patent
Satoh et al.

(10) Patent No.: US 7,605,776 B2
(45) Date of Patent: Oct. 20, 2009

(54) STEREOSCOPIC-VISION IMAGE PROCESSING APPARATUS, STEREOSCOPIC-VISION IMAGE PROVIDING METHOD, AND IMAGE DISPLAY METHOD

(75) Inventors: Seiji Satoh, Kanagawa (JP); Hidehiko Sekizawa, Tokyo (JP); Toshio Nomura, Tokyo (JP); Masahiro Shioi, Chiba (JP); Goro Hamagishi, Osaka (JP); Ken Mashitani, Osaka (JP)

(73) Assignees: Sony Corporation, Tokyo (JP); Sharp Kabushiki Kaisha, Osaka (JP); Sanyo Electric Co., Ltd., Osaka (JP)

( * ) Notice: Subject to any disclaimer, the term of this patent is extended or adjusted under 35 U.S.C. 154(b) by 52 days.

(21) Appl. No.: 10/553,344

(22) PCT Filed: Apr. 16, 2004

(86) PCT No.: PCT/JP2004/005491

§ 371 (c)(1),
(2), (4) Date: Mar. 12, 2007

(87) PCT Pub. No.: WO2004/093469

PCT Pub. Date: Oct. 28, 2004

(65) Prior Publication Data

US 2007/0257902 A1    Nov. 8, 2007

(30) Foreign Application Priority Data

Apr. 17, 2003 (JP) .............................. 2003-113510
Oct. 24, 2003 (JP) .............................. 2003-365331

(51) Int. Cl.
| | | |
|---|---|---|
| G09G 5/00 | (2006.01) | |
| H04N 13/00 | (2006.01) | |
| H04N 13/02 | (2006.01) | |
| G03B 35/00 | (2006.01) | |
| G03B 35/18 | (2006.01) | |
| G03B 21/60 | (2006.01) | |
| G03B 21/00 | (2006.01) | |
| G02B 21/22 | (2006.01) | |
| G02B 27/22 | (2006.01) | |

(52) U.S. Cl. .................. 345/9; 345/7; 345/8; 348/42; 348/46; 352/57; 352/60; 353/6; 353/9; 359/376; 359/458; 359/462; 396/324

(58) Field of Classification Search ................. 345/660, 345/664, 419, 7–9; 348/42, 46–60; 359/462–466, 359/376–378, 458; 352/57, 60–65; 353/6–9; 356/12; 396/324–331
See application file for complete search history.

(56) References Cited

U.S. PATENT DOCUMENTS

2002/0030675 A1* 3/2002 Kawai ....................... 345/204
(Continued)

FOREIGN PATENT DOCUMENTS

JP        07-084234        3/1995
(Continued)

*Primary Examiner*—Kimbinh T Nguyen
*Assistant Examiner*—Tize Ma
(74) *Attorney, Agent, or Firm*—Wolf, Greenfield & Sacks, P.C.

(57) ABSTRACT

This invention provides a stereoscopic-vision image processing apparatus, a stereoscopic-vision image providing method, and an image display method that are capable of managing specification of display unit on which a stereoscopic-vision image is desired to be displayed as accessory information (assumed display information). The assumed display information includes a type and a display size of the display unit on which a stereoscopic-vision image is desired to be displayed. This allows an appropriate stereoscopic-vision image to be obtained by specifying a type or a display size of the display unit that is desired to be displayed with them being combined with the stereoscopic-vision image and scaling the stereoscopic-vision image up or down, in display of a stereoscopic image, in accordance with the type or the display size of the display unit.

22 Claims, 19 Drawing Sheets

U.S. PATENT DOCUMENTS

| | | | |
|---|---|---|---|
| 2002/0177993 A1* | 11/2002 | Veditz et al. | 704/8 |
| 2003/0156188 A1* | 8/2003 | Abrams, Jr. | 348/51 |
| 2005/0078370 A1* | 4/2005 | Nishihara et al. | 359/464 |

FOREIGN PATENT DOCUMENTS

| | | |
|---|---|---|
| JP | 08-252478 | 10/1996 |
| JP | 09-252478 | 10/1996 |
| JP | 08-317429 A | 11/1996 |
| JP | 09-018894 A | 1/1997 |
| JP | 09-074573 A | 3/1997 |
| JP | 09-252478 | 9/1997 |
| JP | 11-046373 | 2/1999 |
| JP | 11-355808 | 12/1999 |
| JP | 2000-152285 A | 5/2000 |
| JP | 2000-284346 A | 10/2000 |
| JP | 2001-346227 | 12/2001 |
| JP | 2002-095018 A | 3/2002 |
| JP | 2002-189441 A | 7/2002 |
| JP | 2003-047028 A | 2/2003 |

* cited by examiner

F I G. 2
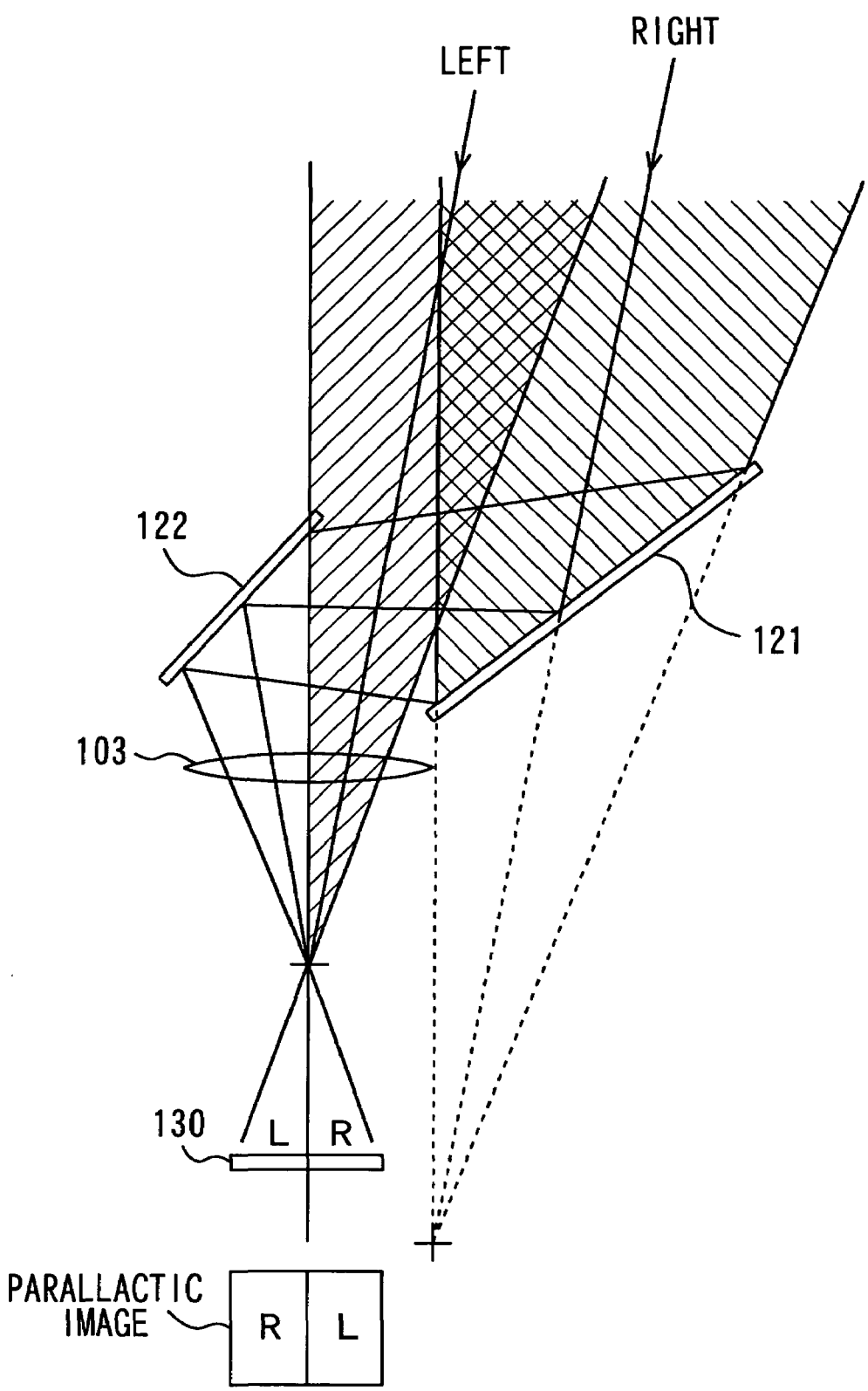

F I G. 4
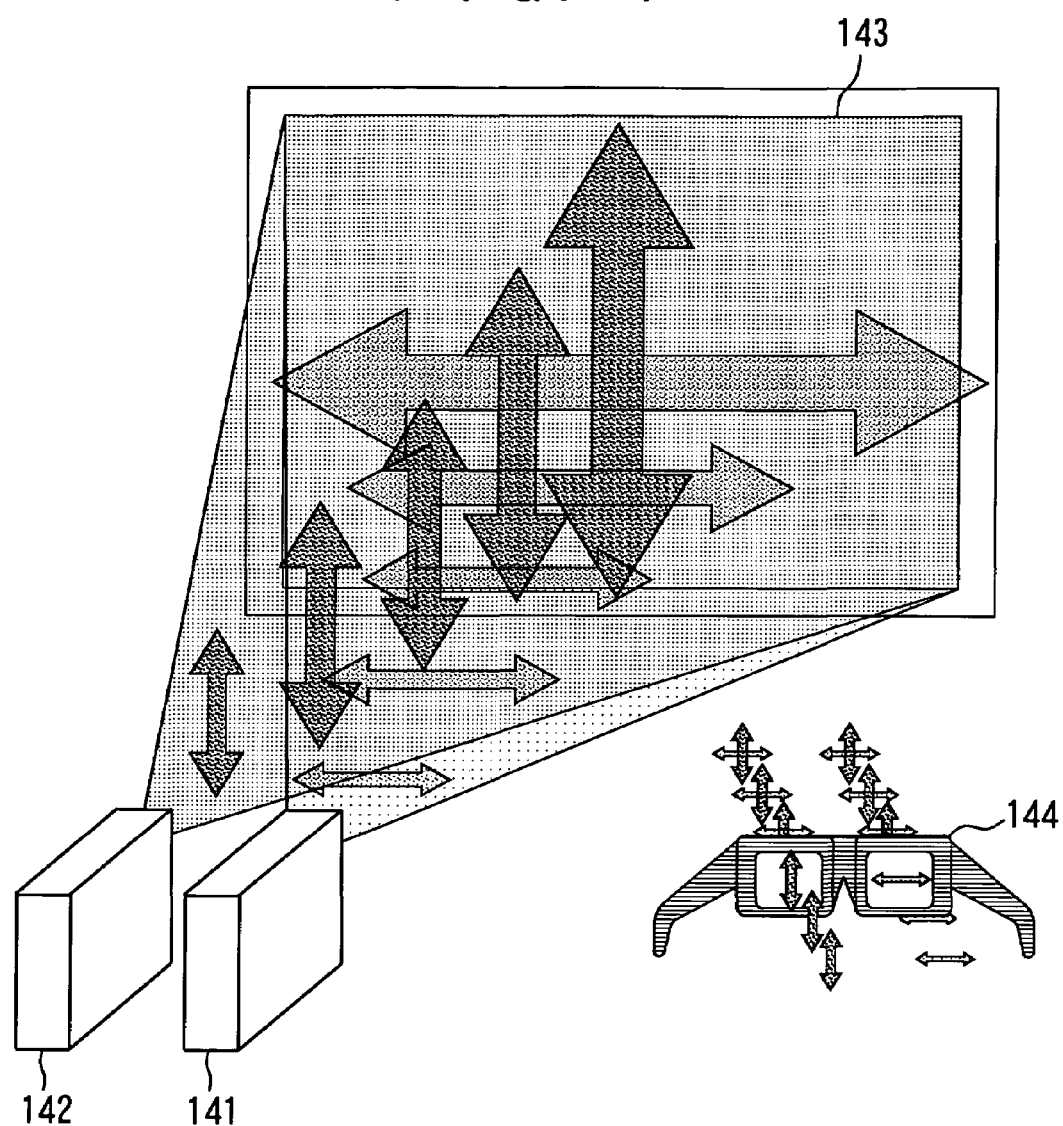

F I G. 5
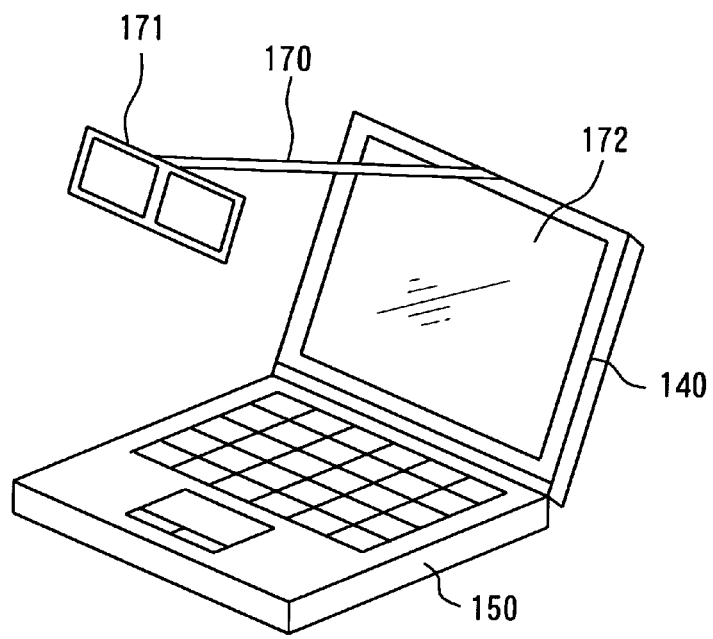
F I G. 6
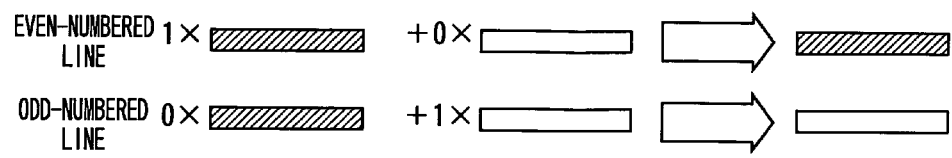

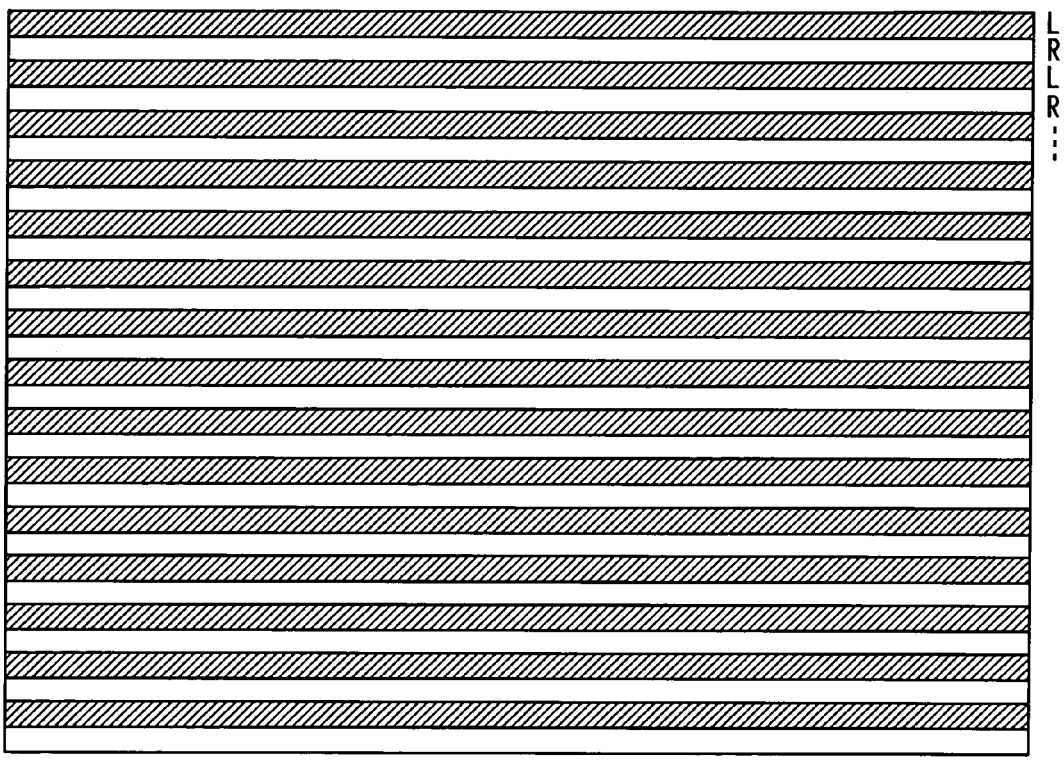
F I G. 7

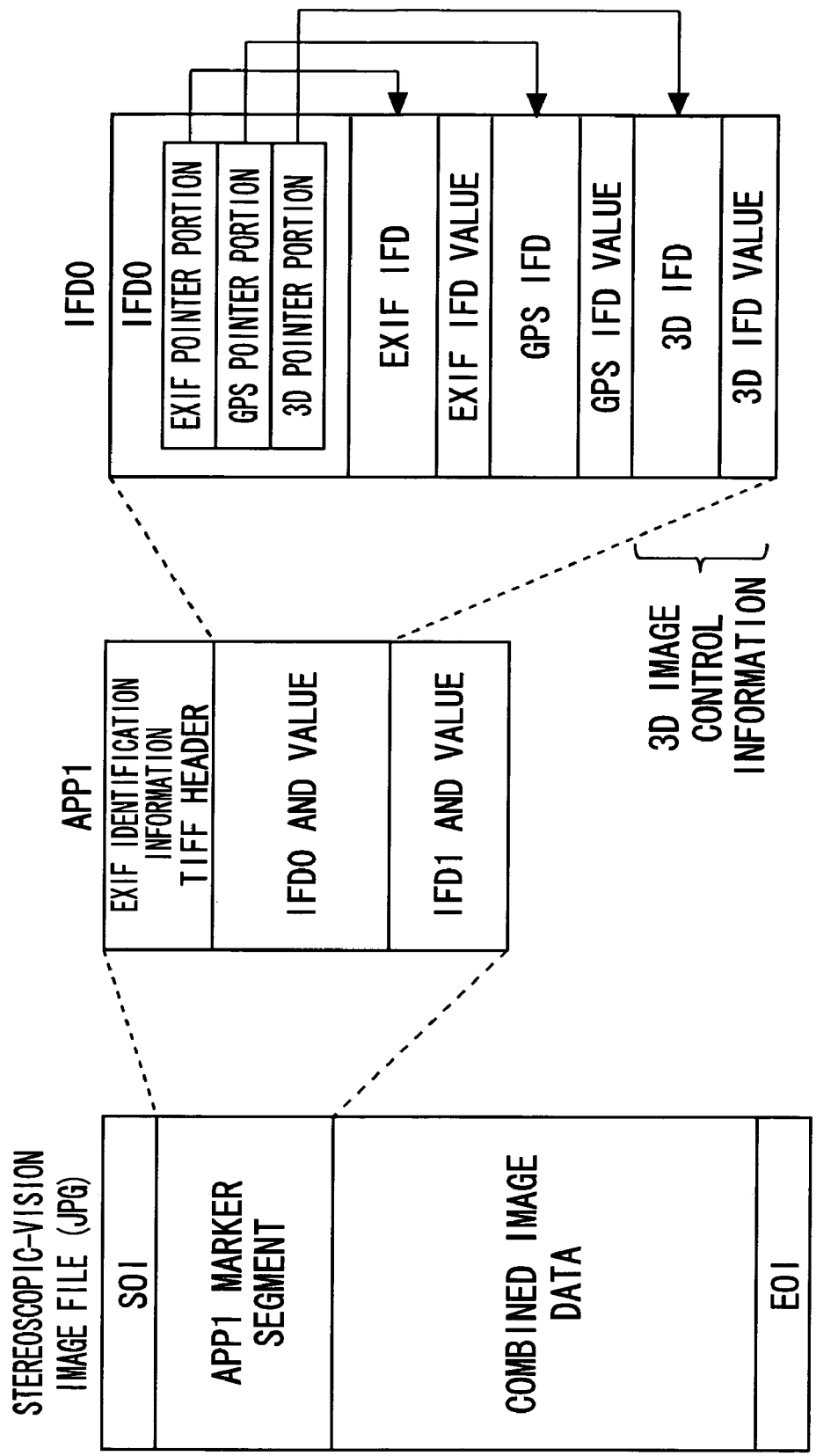

| ELEMENT NAME | NUMBER OF BYTES | RECORDING SIDE | | REPRODUCTION SIDE | |
|---|---|---|---|---|---|
| | | INDISPENSABLE /OPTIONAL | REMARKS | INDISPENSABLE /OPTIONAL | REMARKS |
| 3D PICTURE MANAGEMENT TAG | 4 | ◎ | | | |
| 3D PICTURE MANAGEMENT SIZE | 4 | ◎ | | ◎ | |
| 3D PICTURE MANAGEMENT VERSION | 4 | ◎ | | ◎ | |
| PICTURE STRUCTURE (DATA CONFIGURATION TYPE) | 1 | ◎ | | ◎ | |
| PICTURE SPECIFIC DATA (DATA PECULIAR TO PARALLACTIC IMAGE) | VARIABLE LENGTH | ◎ | | ◎ | |

FIG. 13

| ELEMENT NAME | NUMBER OF BYTES | RECORDING SIDE | | REPRODUCTION SIDE | |
|---|---|---|---|---|---|
| | | INDISPENSABLE /OPTIONAL | REMARKS | INDISPENSABLE /OPTIONAL | REMARKS |
| ASSUMED DISPLAY (ASSUMED DISPLAY SIZE) | 4 | ◎ | | △ | |

FIG. 14

```
ASSUMED DISPLAY
VALID VALUE    0 : PORTABLE TERMINAL   1-4 INCHES
               1 : P D A               2-7 INCHES
               2 : P C                 7-20 INCHES
               3 : T V                 20-50 INCHES
               4 : PROJECTOR           50-100 INCHES
               5 : H M D
```

WARNING !

STEREOSCOPIC VIEWING MAY POSSIBLY BE DIFFICULT.

[ YES ]    [ NO ]

STEREOSCOPIC-VISION IMAGE PROCESSING APPARATUS, STEREOSCOPIC-VISION IMAGE PROVIDING METHOD, AND IMAGE DISPLAY METHOD

TECHNICAL FIELD

The present invention relates to a stereoscopic-vision image processing apparatus, a stereoscopic-vision image providing method, and an image display method that are capable of generating a stereoscopic-vision image to be viewed stereoscopically.

BACKGROUND ART

Conventionally, a stereoscopic-vision image processing apparatus has been known, by which two still images etc. based on a parallax between the right and left eyes are photographed and displayed so that they can be observed by the right and left eyes, respectively, thereby obtaining a stereoscopic image.

A stereoscopic image (stereoscopic-vision image) composed of a left-viewpoint image (L-image) as viewed from the left eye and a right-viewpoint image (R-image) as viewed from the right eye can be displayed on a display unit such as a display, so that it can be viewed stereoscopically.

DISCLOSURE OF THE INVENTION

It, however, has been impossible to specify, a type, a display size and the like of a display unit on which a stereoscopic-vision image composed of one or more than one viewpoint image is desired to be displayed. Therefore, in display of a stereoscopic vision image, when the stereoscopic-vision image is scaled up or down in accordance with a type or a display size of the display unit, a parallax between these viewpoint images is also increased or decreased, so that it has been impossible to obtain an appropriate stereoscopic-vision image.

In view of the above problems, the present invention has been developed, and it is an object of the present invention to provide novel and improved stereoscopic-vision image processing apparatus, stereoscopic-vision image providing method, and image display method that are capable of managing, as accessory information, specification of a display unit on which a stereoscopic-vision image is desired to be displayed.

To solve the above problems, a first aspect of the present invention provides a stereoscopic-vision image processing apparatus for generating a stereoscopic-vision image by composing a plurality of viewpoint images having at least a parallax with respect to each other. The stereoscopic-vision image processing apparatus features managing a plurality of viewpoint images having different viewpoints together with assumed display information about an assumed display unit on which a composed stereoscopic-vision image is desired to be displayed.

According to the present invention, by the stereoscopic-vision image processing apparatus, a plurality of viewpoint images having a parallax with respect to each other and different viewpoints is managed together with the assumed display information about an assumed display unit on which the composed stereoscopic-vision image is desired to be displayed. By such a configuration, an efficiency of selection is improved of the display unit on which a stereoscopic-vision image is desired to be displayed.

The assumed display information may be configured to contain information about a type and/or a display size of an assumed display unit. By such a configuration, the assumed display units can be classified in more detail.

The assumed display information may be configured further to contain information about a type and/or a display size of an assumed display unit as well as assumed display size information for displaying a stereoscopic-vision image in an assumed display size thereof. By such a configuration, it is possible to specify the assumed display unit and also a display size of the stereoscopic-vision image that is desired to be displayed on this assumed display unit.

Alternatively, the assumed display information may be configured to contain assumed display size information for displaying a stereoscopic-vision image in accordance with an assumed display size thereof. By such a configuration, it is possible to specify a display size of a stereoscopic-vision image that is desired to be displayed on an assumed display unit.

A display size of the stereoscopic-vision image may be configured on the basis of at least assumed display information. By such a configuration, it is possible to scale up or down a stereoscopic-vision image according to the assumed display information and display the image on the assumed display unit. It is to be noted that a display unit may be used instead of the assumed display unit.

The assumed display information may be configured to be assumed display size information.

Such a configuration may be employed that when a display size of a stereoscopic-vision image is changed, a screen for informing the change in display size is displayed.

Such a configuration may be employed that when a stereoscopic-vision image is displayed, it is decided whether a warning dialog-box is displayed at least based on a display size of this stereoscopic-vision image and/or the assumed display information. By such a configuration, if a display unit for actually displaying the stereoscopic-vision image is not assumed display unit, the warning dialog-box can be displayed on a display.

Such a configuration may be employed that it is decided whether the warning dialog-box is displayed on the basis of a display lapse of time when the stereoscopic-vision image is displayed. By such a configuration, when the lapse of time when the stereoscopic-vision image is displayed reaches a predetermined period of time, the warning dialog-box can be displayed, thereby mitigating eyestrain due to elongated viewing and also a display processing load or a display power load for the stereoscopic-vision image.

Such a configuration may be employed that it is decided whether the warning dialog-box is displayed on the basis of an accumulation value of a stereoscopic intensity of the stereoscopic-vision image that is accumulated over the display lapse of time when this stereoscopic-vision image is displayed. By such a configuration, it is possible to send out a warning exactly at a period of time when eyestrain is about to begin.

Such a configuration may be employed that it is decided whether the warning dialog-box is displayed on the basis of assumed display size information contained in the assumed display information. By such a configuration, it is possible to prevent a stereoscopic-vision image from being mistakenly displayed in an unexpected condition, thereby avoiding displaying a stereoscopic-vision image having a high stereoscopic intensity by mistake.

Such a configuration may be employed that the warning dialog-box is displayed in response to expansion and/or reduction of a display size of the stereoscopic-vision image.

By such a configuration, it is possible to easily recognize or take notice of fluctuations in stereoscopic intensity caused by fluctuations in parallax of the stereoscopic-vision image owing to restrictions on a display size of a display unit.

Alternatively, such a configuration may be employed that the warning dialog-box is displayed on the basis of assumed display size information contained in the assumed display information and expansion and/or reduction of a display size of the stereoscopic-vision image. By such a configuration, it is possible to easily recognize or take notice of fluctuations in stereoscopic intensity caused by fluctuations in parallax of a stereoscopic-vision image because an assumed display size is specified beforehand.

Such a configuration may be employed that the warning dialog-box is set as an advisory screen if a display size of a stereoscopic-vision image is reduced and the warning dialog-box may be configured to send out a warning that an intensity of the stereoscopic-vision image should be increased.

Such a configuration may be employed that it is decided whether the warning dialog-box is displayed on the basis of a stereoscopic intensity of a stereoscopic-vision image and/or a display lapse of time of the stereoscopic-vision image and the warning dialog-box may be configured so that it can be decided whether it is displayed on the basis of an accumulated value of the stereoscopic intensity.

The above-described stereoscopic-vision image may be configured to be composed of a right-viewpoint image and a left-viewpoint image having a parallax with respect to each other.

Such a configuration may be employed that a right-viewpoint image and a left-viewpoint image would be managed as one combined image and assumed display information would be managed as tag information of the combined image. By such configuration, it is possible to integrate the right-viewpoint and left-viewpoint images and the assumed display information so that they may be managed as a combined image effectively.

This assumed display information may be configured to contain information about a type and/or a display size of the assumed display unit and the assumed display information may be configured to contain assumed display size information for displaying the stereoscopic-vision image in an assumed display size thereof.

This assumed display information may be configured to contain assumed display size information for displaying the stereoscopic-vision image in an assumed display size thereof.

A display size of this stereoscopic-vision image to be displayed on a display screen on which the stereoscopic-vision image is displayed may be configured to be controlled on the basis of at least the assumed display information.

Assumed display information may be configured to be assumed display size information and such a configuration may be employed that when a display size of the stereoscopic-vision image is changed, a screen for informing the change in display size is displayed.

Such a configuration may be employed that it is decided whether the warning dialog-box is displayed, when the stereoscopic-vision image is displayed, based on at least a display size of the stereoscopic-vision image and/or the assumed display information.

Such a configuration may be employed that it is decided whether the warning dialog-box is displayed on the basis of a display lapse of time when the stereoscopic-vision image is displayed.

Such a configuration may be employed that it is decided whether the warning dialog-box is displayed on the basis of an accumulation value of a stereoscopic intensity of the stereoscopic-vision image that is accumulated over the display lapse of time of the stereoscopic-vision image.

Such a configuration may be employed that it is decided whether the warning dialog-box is displayed on the basis of assumed display size information contained in the assumed display information.

Such a configuration may be employed that the warning dialog-box is displayed in response to expansion and/or reduction of a display size of the stereoscopic-vision image or such a configuration may be employed that the warning dialog-box is displayed in response to expansion and/or reduction of a display size of the stereoscopic-vision image.

Such a configuration may be employed that it is decided whether the warning dialog-box is displayed on the basis of a stereoscopic intensity of the stereoscopic-vision image and/or a display lapse of time of the stereoscopic-vision image or it is decided whether the warning dialog-box is displayed on the basis of the accumulation of the stereoscopic intensity.

To solve the above problems, in another aspect of the present invention, a stereoscopic-vision image providing method for providing data of a stereoscopic-vision image which is generated by composing a plurality of viewpoint images having a parallax with respect to each other features that accessory information which is managed together with the data of the plurality of viewpoint images having different viewpoints and relates to an assumed display unit on which the stereoscopic-vision image is desired to be displayed is provided together with the data of the viewpoint images.

According to the present invention, by managing the accessory information accompanying with a plurality of viewpoint images having a parallax with respect to each other and different viewpoints, it is possible to efficiently, for example, provide or search for a viewpoint image that is appropriate for a display unit to display a stereoscopic-vision image.

The accessory information may be configured to be assumed display information, and the assumed display information may be configured to contain information about a type and/or a display size of the assumed display unit.

The assumed display information may be configured to further contain information about a type and/or a display size of the assumed display unit as well as assumed display size information for displaying a stereoscopic-vision image in an assumed display size thereof.

Alternatively, such a configuration may be employed that the assumed display information contains assumed display size information for displaying a stereoscopic-vision image in an assumed display size thereof.

Such a configuration may be employed that a display size of a stereoscopic-vision image to be displayed on a display screen on which the stereoscopic-vision image is displayed is controlled on the basis of at least assumed display information.

The assumed display information may be configured to be assumed display size information and the stereoscopic-vision image may be configured to be composed of right-viewpoint and left-viewpoint images having a parallax with respect to each other.

Such a configuration may be employed that the right-viewpoint and left-viewpoint images are managed as one combined image and assumed display information is managed as tag information of the combined image.

To solve the above problems, a further aspect of the present invention features that a stereoscopic-vision image processing apparatus for generating a stereoscopic-vision image by composing a right-viewpoint image and a left-viewpoint image having a parallax with respect to each other is provided, and the right-viewpoint image and the left-viewpoint image are individually managed together with assumed display information about an assumed display unit on which the composed stereoscopic-vision image is desired to be displayed.

According to the present invention, by the stereoscopic-vision image processing apparatus, a right-viewpoint image and a left-viewpoint image are managed together with assumed display information about an assumed display unit on which the composed stereoscopic-vision image is assumed to be desirably displayed. By such a configuration, it is possible to efficiently select a display unit on which the composed stereoscopic-vision image is desired to be displayed.

Such a configuration may be employed that the right-viewpoint and left-viewpoint images are managed as one combined image and the assumed display information is managed as tag information of the combined image. By such a configuration, it is possible to integrate the right-viewpoint and left-viewpoint images and the assumed display information and efficiently manage them as the combined image.

The assumed display information may be configured to contain information about a type and a display size of the assumed display unit.

To solve the above-described problems, a still further aspect of the present invention provides an image display method for generating a stereoscopic-vision image by composing a plurality of viewpoint images having at least a parallax with respect to each other and displaying it. This image display method features that stereoscopic-vision images having almost the same display size are displayed on at least two displays.

Such a configuration may be employed that when a display size of the stereoscopic-vision image is changed, this change in display size is informed or that a warning dialog-box is displayed in response to expansion and/or reduction of a display size of the stereoscopic-vision image.

BRIEF DESCRIPTION OF THE DRAWINGS

FIG. 2 is an explanatory illustration of a configuration example of the optical adapter of FIG. 1;

FIG. 4 is an explanatory illustration of a schematic configuration of a stereoscopic-vision image display by means of a projector according to the present embodiment;

FIG. 5 is an explanatory illustration of a schematic configuration of computer device according to the present embodiment;

FIG. 6 is an explanatory illustration of processing to generate a stereoscopic-vision image by composing an R-image and an L-image according to the present embodiment;

FIG. 7 is an explanatory illustration of a stereoscopic-vision image according to the present embodiment;

FIG. 10 is an explanatory diagram of an outlined data structure of a stereoscopic-vision image file according to the present embodiment;

FIG. 12 is an explanatory table of a schematic configuration of a tag related to image control information according to the present embodiment;

FIG. 13 is another explanatory table of the schematic configuration of the tag related to the image control information according to the present embodiment;

FIG. 14 is an explanatory illustration of an outline of a value which is set in a field of a tag of "Assumed Display" according to the present embodiment;

FIG. 17 is an explanatory illustration of a schematic configuration of a warning dialog-box example according to the present embodiment;

BEST MODE FOR CARRYING OUT THE INVENTION

The following will describe in detail preferred embodiments of the present invention with reference to appended drawings. It is to be noted that in the following description and the appended drawings, components that have roughly the same functions and configurations are indicated by the same symbols, to avoid duplicated description thereof.

There are a lot of methods (hereinafter referred to as "stereoscopic viewing methods") for stereoscopically visualizing a two-dimensional image by utilizing a spatial gap (binocular parallax) between retinal images acquired by the respective right and left eyes of a human being etc.

As stereoscopic viewing methods, an anaglyph system, a color anaglyph system, a polarization filter system, a time-sequential stereoscopic television system etc. which utilize special glasses, and a lenticular system etc. which do not utilize special glasses, etc. have been known.

To realize these various stereoscopic viewing methods, it is necessary to acquire a left-viewpoint image for the left eye (L-image) and a right-viewpoint image for the right eye (R-image). The easiest way of acquiring the L-image and the R-image is to photograph the same subject twice by moving a camera by as much as a distance between the eyes of a person.

Figure 1:
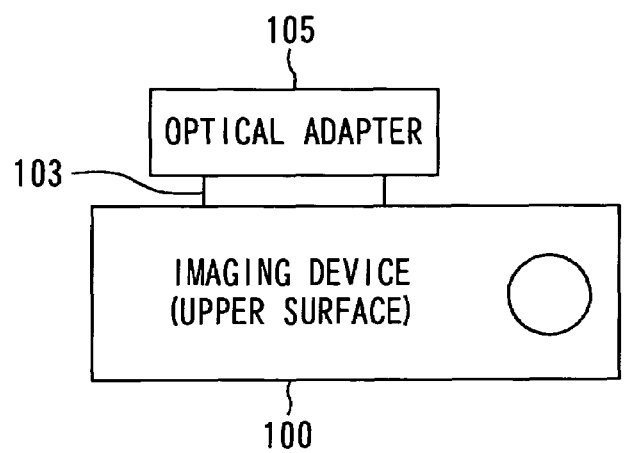
FIG. 1 is an explanatory diagram of a schematic configuration of an imaging device mounted with an optical adapter according to a present embodiment.

Further, as a method for acquiring the L-image and the R-image in one time, for example, a method of attaching an optical adapter 105 made of a mirror etc. to an outside of a lens 103 of an imaging device 100 as shown in FIGS. 1 and 2 has been known. It is to be noted that this imaging device 100 may be, for example, a digital camera.

Figure 3:
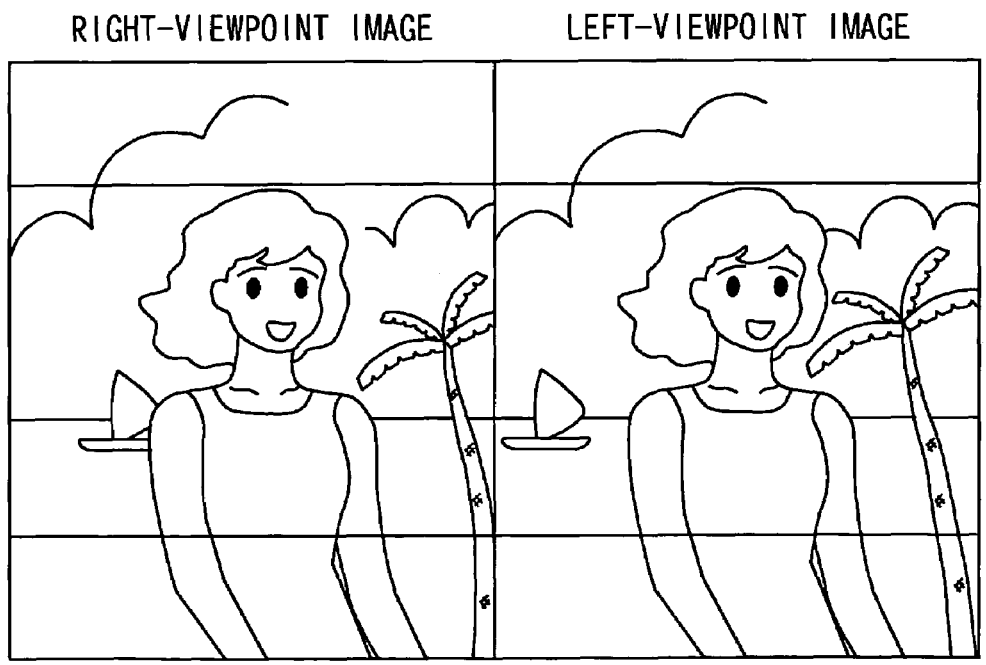
FIG. 3 is an explanatory illustration of a parallactic image that is imaged by an imaging device mounted with the optical adapter according to the present embodiment.

Further, as a method of generating stereoscopic images (stereoscopic-vision images, 3D images) by composing various viewpoint images and displaying it as shown in FIG. 3, a polarization filter system such as one shown in FIG. 4 is available.

As shown in FIG. 4, the polarization filter system comprises a right-eye projector 141 for projecting an R-image, a left-eye projector 142 for projecting an L-image, a screen 143 for reflecting L-image light and R-image light, and polarization glasses 144. It is to be noted that a 3D (three-dimensional) image refers to a stereoscopic-vision image that can be viewed stereoscopically.

The right-eye projector 141 is equipped with a polarization filter vertically. The left-eye projector 142 is equipped with a polarization filter horizontally. Therefore, as R-image light projected from the right-eye projector 141, horizontal arrow-directional light shown in FIG. 4 is projected. As L-image light projected from the left-eye projector 142, vertical arrow-directional light shown in FIG. 4 is projected.

Next, on the screen 143, an L-image projected by vertical linear polarization and an R-image projected by horizontal linear polarization are superimposed on each other to generate a stereoscopic-vision image.

By using the polarization glasses 144 having a horizontal linear polarization filter on its left side and a vertical linear polarization filter on its right side, of the stereoscopic-vision image reflected by the screen 143, the R-image projected by the right-eye projector 141 passes through only the right-side linear polarization filter and the L-image projected from the left-eye projector 142 passes through only the left-side linear polarization filter.

Therefore, the stereoscopic-vision image on that screen 143 as viewed through the polarization glasses 144 may appear stereoscopically, for example, a building etc. may appear as protruding.

Besides the case of generating a stereoscopic-vision image on the screen 143 shown in FIG. 4, a stereoscopic-vision image can be generated and displayed using, for example, a personal computer (PC) or computer device. Next, a case of generating a stereoscopic-vision image by using computer device according to the present embodiment will be described with reference to FIGS. 5-8.

As described above, owing to reflection by mirrors 121 and 122 shown in FIG. 2, a parallactic image having a parallax between right and left viewpoints is generated. Although this parallactic image is made up of an L-image and an R-image as shown in FIG. 2, the present invention is not limited to such a case.

Next, a computer device applied to a stereoscopic-vision image processing apparatus according to the present embodiment will be described with reference to FIG. 5. FIG. 5 is an explanatory illustration of a schematic configuration of the computer device according to the present embodiment.

The computer device 150 is an information processing equipment that has at least a central processing unit (CPU) and a storage section and relates generally to a computer device but may include information processing equipment such as a mobile terminal, a personal digital assistant (PDA), a notebook personal computer, and a desktop personal computer.

As shown in FIG. 5, the computer device 150 further comprises a computer device 150 for generating a stereoscopic-vision image, polarization glasses 171 used by a user when he or she sees a displayed stereoscopic-vision image, a stereoscopic-vision display section 140 for displaying a stereoscopic-vision image, and a line polarization plate 172 arranged outside a display surface of this stereoscopic-vision display section 140.

The polarization glasses 171 are supported by a support rod 170 mounted to the computer device 150 in such a manner that they may be located in a space around above a keyboard of the computer device 150.

Next, generated L-image and R-image are composed as shown in FIG. 6 in accordance with the following Equation 1, to generate a stereoscopic-vision image as shown in FIG. 7. That is, a stereoscopic-vision image is generated from a parallactic image comprised of a right-viewpoint image and a left-viewpoint image. It is to be noted that an even-numbered line and an odd-numbered line refer to horizontal rows which is provided in the stereoscopic-vision display section 140 equipped to the computer device 150.

For example, in a case where the display section is of an ultra extended graphics array (UXGA), assuming the top one of the horizontal lines to be the 0'th line, the 0'th line is an even-numbered line, the next 1'st line is an odd-numbered line . . . , and the bottom line (1599'th line) is, . . .

For even-numbered lines:

$1\times(L\text{-image pixel})+0\times(R\text{-image pixel})=(\text{pixel of stereoscopic-vision image})$; and for odd-numbered lines:

$0\times(L\text{-image pixel})+1\times(R\text{-image pixel})=(\text{pixel of stereoscopic-vision image})$ Equation 1

As shown in FIG. 7, by composing an L-image and an R-image for each of the horizontal lines starting from the 0'th line sequentially, a stereoscopic-vision image in which the L-image and the R-image are composed for every second line is generated. The generated stereoscopic-vision image is displayed, for example, on the stereoscopic-vision display section 140 equipped to the computer device.

Figure 8:
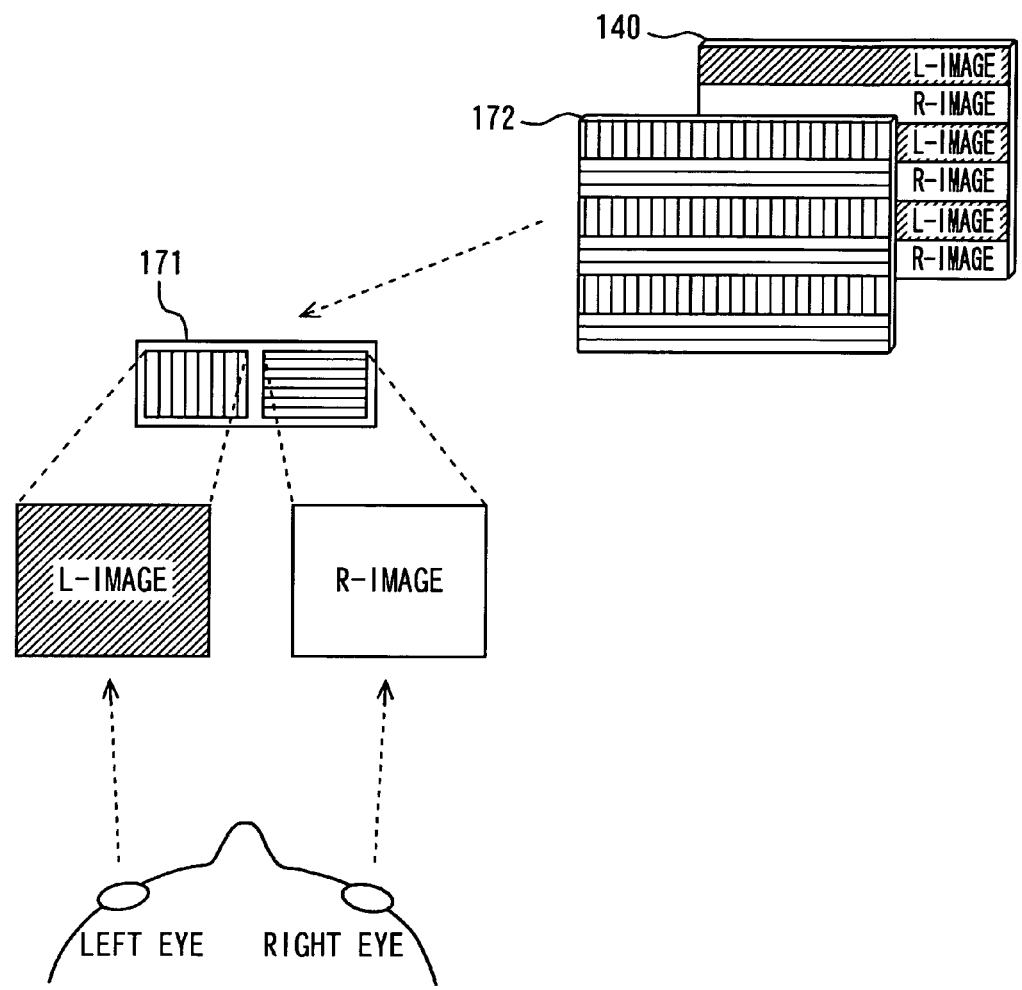
FIG. 8 is an explanatory illustration of an outline of stereoscopic viewing of a stereoscopic-vision image in accordance with the present embodiment.

As shown in FIG. 8, the user views the stereoscopic-vision image displayed on the stereoscopic-vision display section 140, through the polarization glasses 171. It is to be noted that the stereoscopic-vision display section 140 is equipped with a line polarization plate 172 beforehand.

This line polarization plate 172 has a plurality of horizontal lines. The line polarization plate 172 comprises a vertical polarization plate for even-numbered lines starting from the top one and a horizontal polarization plate for odd-numbered lines of the plurality of lines.

A horizontal polarization filter is provided on the right side of the polarization glasses 171 and a vertical polarization filter is provided on its left side. Therefore, of the light of the L-image or the light of the R-image that passes through the line polarization plate 172, only the light of the L-image comprised of the even-numbered lines passes through left side glass of the polarization glasses 171 as well as only the light of the R-image comprised of the odd-numbered lines passes through the right side glass thereof. Accordingly, the user can view the stereoscopic-vision image stereoscopically.

(Stereoscopic-Vision Image Processing Apparatus)

Figure 9:
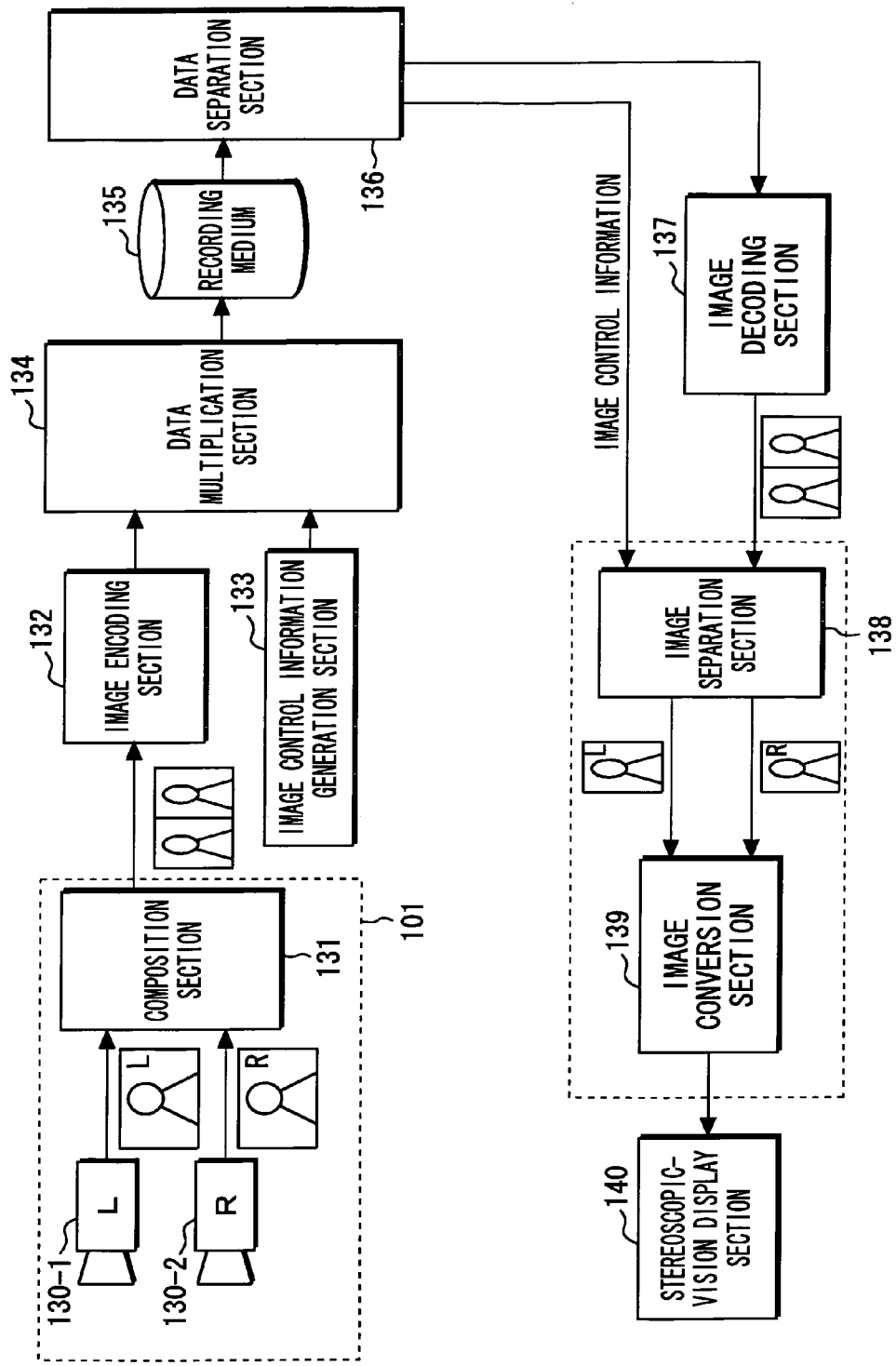
FIG. 9 is a block diagram of a schematic configuration of an image processing apparatus according to the present embodiment.

The following will describe a stereoscopic-vision image processing apparatus according to the present embodiment with reference to FIG. 9. FIG. 9 is a block diagram of a schematic configuration of the stereoscopic-vision image processing apparatus according to the present embodiment. It is to be noted that the stereoscopic-vision display section 140 according to the present embodiment is device for displaying a stereoscopic-vision image and corresponds to, for example, a display unit, an assumed display unit, etc.

As shown in FIG. 9, the stereoscopic-vision image processing apparatus for generating a stereoscopic-vision image that can be viewed stereoscopically comprises at least one of a photographing section 101, an image encoding section 132, an image control information generation section 133, a data multiplication section 134, a recording medium 135, a data separation section 136, an image decoding section 137, an image separation section 138, an image conversion section 139, and a stereoscopic-vision display section 140.

The photographing section 101 is comprised of photographing elements (CCD) 130-1 and 130-2 for photographing a subject and a composition section 131. It is to be noted that the photographing elements 130-1 and 130-2 may be integrated into one photographing element 130. In this case, the optical adapter 105 etc. can be equipped therewith.

An image (L-image or left-viewpoint image) from a left-eye viewpoint photographed by the photographing element 130-1 and an image (R-image or right-viewpoint image) from a right-eye viewpoint photographed by the photographing element 130-2 are transmitted to the composition section 131. It is to be noted that although the stereoscopic-vision image processing apparatus shown in FIG. 9 is described with reference to an example of two viewpoints, the present invention is not limited to such a case and is applicable also to the case of multiple viewpoints.

The composition section 131 produces a parallactic image from the viewpoint images (L-image and R-image) transmitted to it. For example, these viewpoint images are composed in such a manner that they may be adjacent to each other. Although in a parallactic image shown in FIG. 9 the L-image and R-image are adjacent side by side, the present invention is not limited to such the example.

This parallactic image is encoded by the image encoding section 132. This encoding is illustratively performed in a joint photographic experts group (JPEG) format.

The image control information generation section 133 generates tag information (hereinafter referred to as "image control information") required to, for example, convert that parallactic image into a stereoscopic-vision image. The image control information contains photographing information such as an exposure, a date/time, flashing/non-flashing, etc. at the time of photographing by the photographing section 101, information for generating a proper stereoscopic-vision image on the stereoscopic-vision display section 140, etc. For example, it contains a rotation angle by which a viewpoint image in the parallactic image is to be rotated.

The data multiplication section 134 multiplies the parallactic image transmitted from the image encoding section 132 and the image control information transmitted from the image control information generation section 133. The multiplied parallactic image and image control information are recorded in the recording medium 135.

The recording medium 135 is a device that is capable of recording data, and illustrates a hard disk drive (HDD), a CD rewritable (CD-RW), a DVD random access memory (DVD-RAM), an electrically erasable programmable read only memory (EEPROM), or a memory stick (registered trade name), etc.

The data separation section 136 acquires the parallactic image and the image control information, respectively, which are recorded in the recording medium 135. The data separation section 136 transmits the acquired parallactic image to the image decoding section 137 and the image control information to the image separation section 138. It is to be noted that the parallactic image data and the image control information are recorded at a predetermined location (folder etc.) in the recording medium 135 beforehand.

Although the data separation section 136 of the present embodiment has been described with reference to a case where it acquires the parallactic image and the image control information from the recording medium 135, the present invention is not limited to it; for example, it is applicable to a case where it acquires them through a network.

The image decoding section 137 decodes the parallactic image data encoded beforehand and transmits it to the image separation section 138.

The image separation section 138 acquires a parallactic image specified in the image control information and separates it into images (L-image and R-image) of both viewpoints, based on the image control information transmitted from the data separation section 136.

The image conversion section 139 superimposes the L-image and the R-image transmitted from the image separation section 138, to convert them into a stereoscopic-vision image.

The stereoscopic-vision display section 140 displays the stereoscopic-vision image converted by the image conversion section 139. The stereoscopic-vision display section 140 may be, for example, a display section of a display etc. equipped to the later-described computer device, a projector device for displaying images on a screen by projection, etc. It is to be noted that such a stereoscopic-vision display section 140 of the present embodiment is effective not only in the case of displaying a stereoscopic-vision image but also in the case of, for example, displaying a two-dimensional still image or moving image or outputting audio.

(Imaging Device 100)

The imaging device 100 shown in FIG. 1 comprises at least one of the imaging section 101, the image encoding section 132, the image control information generation section 133, and the data multiplication section 134 shown in FIG. 9.

(Computer Device 150)

The computer device 150 shown in FIG. 5 comprises the data separation section 136, the image decoding section 137, the image separation section 138, the image conversion section 139, and the stereoscopic-vision display section 140 of such a configuration as shown in FIG. 9. It is to be noted that the computer device 150 may further comprises the image encoding section 132, the image control information generation section 133, the data multiplication section 134, and the recording medium 135.

The computer device 150 takes in data of a parallactic image photographed by the imaging device 100 mounted with the optical adapter 105 shown in FIG. 1. Alternatively, the computer device 150 takes in data of an image photographed by it in a condition where it is not mounted with the optical adapter 105. It is to be noted that the imaging device 100 of the present embodiment may be, for example, a digital still camera, a digital video camera, etc.

Furthermore, the computer device 150 generates stereoscopic-vision image data by using the taken-in parallactic image data or data of successively photographed two images. The generated stereoscopic-vision image data is displayed on the stereoscopic-vision display section 140 as a stereoscopic-vision image.

It is to be noted that image control information generated by the image control information generation section 133 is added to image data such as a parallactic image taken-in by the computer device 150 from the imaging device 100. It is to be noted that even in a case where image control information is not added to the taken-in image data, the image control information may be added or, for example, edited by the image control information generation section 133 equipped to the computer device 150.

(Stereoscopic-vision Image File)

The following will describe a stereoscopic-vision image file according to the present embodiment with reference to FIG. 10. FIG. 10 is an explanatory diagram of an outlined data structure of a stereoscopic-vision image file according to the present embodiment.

As shown in FIG. 10, a stereoscopic-vision image file is a compressed JPEG data file having a file name of, for example, "file 1.jpg" with an extension of ".jpg". Further, the stereoscopic-vision image file can give parallactic image data comprised of, for example, the above-described right-viewpoint image and left-viewpoint image.

The stereoscopic-vision image file is recorded in accordance with the design rule for camera file system (DCF) standard and has an application marker segment (APP1) inserted into it.

The APP1 is arranged immediately following a start of image (SOI), which indicates a start of a stereoscopic-vision image file.

Furthermore, immediately following the APP1, combined image data is arranged, and at the end, an end of image (EOI) that indicates an end of a stereoscopic-vision image file is arranged. A combined image will be described later.

A region of the APP1 is comprised of identification information of an exchangeable image file format (Exif) and an accessory information body (Tiff header, IFD0, and IFD1) as shown in FIG. 10. A size of the APP1 including all of these must not exceed 64K bytes according to the JPEG standard.

The accessory information employs a Tiff structure containing a file header (Tiff header) and can record up to two IFDs (IFD0 (0'th IFD) and IFD1 (1'st IFD)). It is to be noted that IFD stands for "image file directory".

The IFD0 records accessory information about a compressed image (main image) or a stereoscopic-vision image (3D image). As shown in FIG. 10, in the IFD0 region, an Exif pointer portion in which a pointer of an Exif IFD is placed, a GPS pointer portion in which a pointer of a GPS IFD is placed, and a 3D pointer portion in which a pointer of a 3D IFD is placed are arranged.

In the IFD0 region, following these pointer portions, Exif IFD, Exif IFD Value, GPS IFD, GPS IFD Value, 3D IFD, and 3D IFD VALUE are further arranged.

Exif IFD and Exif IFD Value record a tag or a tag value related to characteristics of image data, a structure thereof, user information, photographing condition, a date, a time, etc. A "User comment" tag for a user comment, an "Exposure Time" tag that indicates an exposure time, a "Flash" tag that indicates flashing/non-flashing, etc. are provided for example.

The GPS IFD and the GPS IFD Value record a tag or a tag value related to a global positioning system (GPS). For example, a tag "GPS Latitude" that indicates a latitude and a tag "GPS Altitude" that indicates an altitude are provided for example.

The above-described 3D IFD and 3D IFD Value record a tag or a tag value (Value) related to image control information for controlling processing etc. for conversion into a stereoscopic-vision image, which is a 3D image. The image control information will be described in detail later.

It is to be noted that the data structure of a stereoscopic-vision image file according to the present embodiment is not limited to the above-described examples and any other data structures may be realized. For example, in a case where the stereoscopic-vision image file data structure is made of JPEG data, each item of the JPEG data may contain a JPEG header, compressed image data, and an end of image (EOI). This JPEG header contains a start of image (SOI) and accessory information such as color management information. Further, viewpoint information such as a viewpoint number of viewpoint image data can be allocated, for example, in each JPEG header. A plurality of viewpoint images having different viewpoints can be provided in a form of a file header, the following plurality of items of JPEG data, and file end information that indicates an end of the entirety. If no header is present for the entirety (in the case of a combined image), viewpoint information is stored in a JPEG header (application marker/IFD).

(Image Information)

A stereoscopic-vision image file according to the present embodiment is comprised of viewpoint image data that provides a main image generated by photographing or recording etc. and image control information. It is to be noted that the viewpoint image data and the image control information are prescribed in the DCF standard.

(Image Format)

Figure 11A:
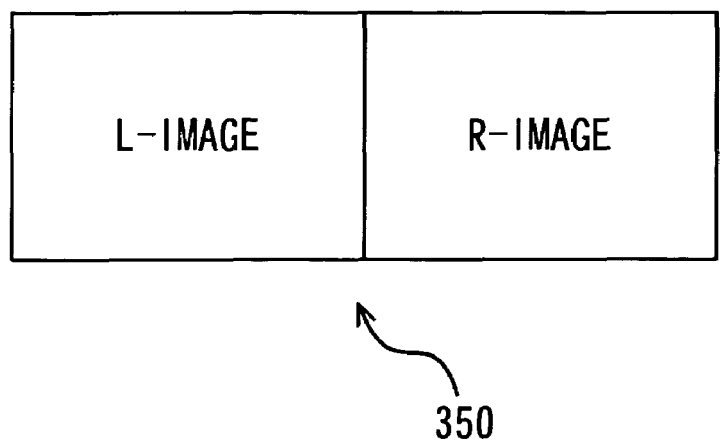
FIG. 11A is an explanatory diagram of a schematic configuration of combined image data according to the present embodiment.
Figure 11B:
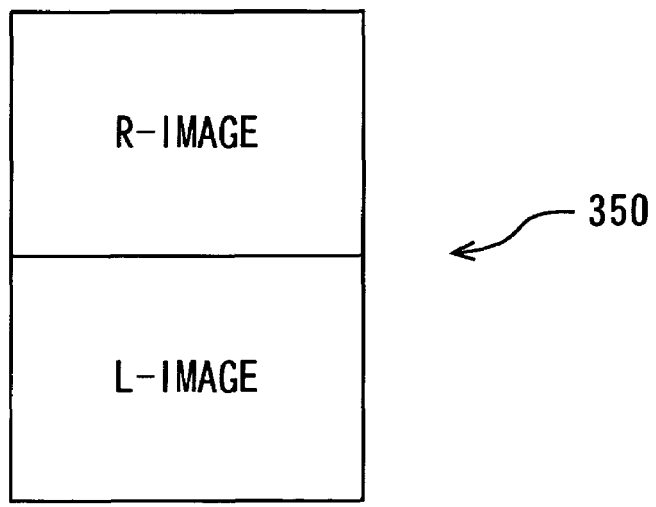
FIG. 11B is an explanatory diagram of another schematic configuration of the combined image data according to the present embodiment.

Next, combined image data according to the present embodiment will be described with reference to FIGS. 11A and 11B. FIGS. 11A and 11B are explanatory diagrams of schematic configurations of combined image data according to the present embodiment.

As shown in FIGS. 11A and 11B, combined image data of the present embodiment is one example of a parallactic image comprised of a viewpoint image (L-image) for the left eye and a viewpoint image (R-image) for the right eye. It is to be noted that each of the L-image and R-image is a viewpoint image photographed from each viewpoint. These viewpoint images, which are still images, are composed into a 3D stereoscopic-vision image.

The above-described combined image data is configured so that L-image data and R-image data are integrated into one image. Therefore, in the combined image, the L-image and the R-image are combined.

A combined image 350 shown in FIG. 11A is configured so that the L-image and the R-image are arranged adjacent to each other horizontally. The combined image 350 shown in FIG. 11B, on the other hand, is configured so that the L-image and the R-image are integrally combined vertically.

Although the combined image of the present embodiment has been described in a case where it is of two viewpoints, the present invention is not limited to it; the present invention is applicable also to a case where images photographed from a plurality of viewpoints are combined into one image and recorded.

(Image Control Information)

To record stereoscopic-vision image data according to the present embodiment, it is necessary to record image control information given as tag information in, for example, a recording medium such as a hard disk drive, a memory, or a CD-ROM as described above. The following will describe a tag related to image control information of the present embodiment.

A tag related to 3D image control information of the present embodiment will be described with reference to FIGS. 12 and 13. FIGS. 12 and 13 are explanatory tables of a schematic configuration of a tag related to image control information according to the present embodiment. It is to be noted that in FIGS. 12 and 13, symbols in a "Indispensable/Optional" column are as follows: ⊚: Indispensable, Δ: Optional (Omissible).

As shown in FIG. 12, image control information according to the present embodiment is tag information, which begins with "3D Picture Management Tag". The "3D Picture Management Tag" is a tag comprised of four bytes and indispensable for both of recording side and reproduction side of a 3D image data. It is to be noted that reproduction means to convert image data of a combined image into 3D image data and display it on a display etc.

Next, "3D Picture Management Size" is a tag comprised of four bytes and indispensable for both of recording side and reproduction side.

"3D Picture Management Version" is a tag comprised of four bytes and indispensable for both of recording side and reproduction side.

"Picture Structure" is a tag comprised of one byte and indispensable for both of recording side and reproduction side.

"Picture Specific Data" is a collection of tags related to data peculiar to the parallactic image of the 3D image data and indispensable for both of recording side and reproduction side on at least one or more tags.

As shown in FIG. 13, "Assumed Display", which is a tag related to "Picture Structure", is comprised of four bytes and indispensable for recording side and optional for reproduction side. It is to be noted that "Assumed Display" is a tag provided to display a stereoscopic-vision image having an appropriate size on the stereoscopic-vision display section 140 capable of displaying a 3D image (stereoscopic-vision image). Therefore, in fields of the "Assumed Display" tag, a type and a size of the stereoscopic-vision display section 140 are set. Although the size of the stereoscopic-vision display section 140 is given in inches in the present embodiment, the present invention is not limited to it.

(Assumed Display Information)

In addition to specification of a crop region or a valid region, when displaying a stereoscopic-vision image in a viewpoint image data, a type of an assumed stereoscopic-vision display section 140, a size of a display, etc. can be set using the above-described "Assumed Display" tag.

When displaying a stereoscopic-vision image, if a stereoscopic-vision image converted from a parallactic image for display on a portable terminal having a small size of one inch or so is directly expanded and displayed instead of being displayed as correlated with dots on a television etc. having a large size of 50 inches or so, a parallax is increased corresponding to the size of the display, so that a user view such a stereoscopic-vision image as to have a very large stereoscopic effect and so has eyestrain. Further, if the expanded parallax exceeds "65 mm", which is a width between the eyes (eye distance), a stereoscopic-vision image at infinity collapses and so cannot be viewed stereoscopically.

Therefore, in a field of the "Assumed Display" tag in which assumed display information is set, assumed display information related to a display unit (assumed display unit) on which a stereoscopic-vision image is desirably displayed is set. It is to be noted that dot-correlated display refers to a display a plurality of dots (pixels) constituting an image with them correlating to a plurality of dots (pixels) on a display screen in a one-to-one relationship. The same concept as this dot-correlated display may include 100% display, pixel-correlated display, etc. for example. Further, the assumed display information may include, for example, assumed display information.

If assumed display information is set, when displaying a stereoscopic-vision image on the screen of the stereoscopic-vision display section 140, the assumed display information attached to each viewpoint image is checked together with each of the viewpoints images. That is, the stereoscopic-vision display section 140 checks whether display on the stereoscopic-vision display section 140 is permitted, based on an assumed display size of the stereoscopic-vision image and an actual display size on the stereoscopic-vision display section 140.

It is to be noted that this assumed display size refers to a display size for specifying a size of a stereoscopic-vision image beforehand so that it may be displayed in an assumed size when displaying stereoscopic-vision image data on a display. In this case, the assumed display size is indicated in inches or the like. Further, the assumed display size is set in assumed display size information contained in the above-described assumed display information.

Further, a header of data of each viewpoint image contains information such as the vertical and horizontal numbers of picture elements (pixels) of the viewpoint image. The vertical and horizontal numbers of pixels of a stereoscopic-vision image are obtained according to the viewpoint image data header.

Further, the information about a display size of a stereoscopic-vision image may be obtained, for example, in accordance with viewpoint display size information contained in a header portion of each viewpoint image. The display size information contains information about the vertical and horizontal numbers of pixels of a stereoscopic-vision image, the number of pixels per inch (pixels/inch), etc. It is to be noted that a display size refers to a size of a stereoscopic-vision image which is actually displayed on the display of the stereoscopic-vision display section 140.

By setting assumed display information about a stereoscopic-vision image or an assumed display unit, it is possible to prevent a stereoscopic-vision image from being displayed on the stereoscopic-vision display section 140 in an unexpected condition. It is to be noted that the assumed display information is not limited to such an example as far as it relates to a stereoscopic-vision image or an assumed display unit.

The assumed display information contains a type (assumed display type information) or a display size (assumed display size information) of the stereoscopic-vision display section 140 of a display unit (assumed display unit) on which a stereoscopic-vision image is desired to be displayed. Its value is set to at least one of the assumed display size information and the assumed display type information.

Furthermore, the assumed display information contains assumed display size information that indicates a display size of an assumed stereoscopic-vision image. It is to be noted that when displaying a stereoscopic-vision image on the stereoscopic-vision display section 140, a display size of the stereoscopic-vision image is controlled on the basis of the assumed display size information.

For example, in a case where resolution of the stereoscopic-vision display section 140 is the same and two displays of the stereoscopic-vision display section 140 have display sizes of one or two inches, assuming a size of a stereoscopic-vision image displayed on the one-inch stereoscopic-vision display section 140 to be an assumed display size, the display size is controlled so that the stereoscopic-vision image of this assumed display size may be displayed also on the two-inch display. It is to be noted that ordinarily a stereoscopic-vision image displayed on the one-inch stereoscopic-vision display section 140 is displayed in four-fold size on the two-inch stereoscopic-vision display section 140.

A field of the "Assumed Display" tag is comprised of four bytes. As shown in FIG. 14, assumed display information is stored in the "Assumed Display" field. The assumed display information is selected from six types of stereoscopic-vision display sections 140 as an assumed display unit. It is to be noted that the present invention is not limited such a cases; it is possible to add a type of the stereoscopic-vision display section 140 as a new assumed display unit.

To the lowest-order one byte of the field, a value is set which indicates a type (information of an assumed display type) of an assumed display unit. Therefore, as shown in FIG. 14, any one of "0" through "5" is set as assumed display type information. It is to be noted that "HMD" indicated by "5" stands for "head mount display". "Portable terminal" indicated by "0" includes a cellular phone. The assumed display type information according to the present embodiment may take not only on a numeral of "0" through "5" but also on a character, a symbol, etc. Even if a value that indicates a type of an assumed display unit is set as the assumed display type information, a type of an assumed display unit on which a stereoscopic-vision image is desirably displayed is set down.

Next, in the second byte through the fourth bytes of the field, a value that indicates a size (assumed display size information) of the display of the stereoscopic-vision display section 140 is set. It is given in units of an inch. It is to be noted that a type of the assumed display unit can be set down also in accordance with a value set to the assumed display size information as shown in FIG. 14.

As shown in FIG. 14, for example, in a case where a display size in a range of one through four inches is set to the second through fourth bytes, "0" (portable terminal) is set down uniquely to the first byte. It is to be noted that if the size is indeterminate, for example, a value of "0XFFFFFF" in hexadecimal is set.

The image control information of the present embodiment further contains a tag (stereoscopic intensity tag) that indicates a stereoscopic intensity of a stereoscopic-vision image. It is to be noted that the stereoscopic intensity indicates an intensity of a stereoscopic effect in display of a stereoscopic-vision image, so that the higher a level value of the stereoscopic intensity is, the higher the stereoscopic effect becomes in display of a stereoscopic-vision image.

A level value of the stereoscopic intensity is indicated in a range of 0-3 depending on, for example, an amount of a parallax of a stereoscopic-vision image etc., in which if the level value is 0, the stereoscopic effect is the lowest. If the level value is 3, on the other hand, the stereoscopic effect is the highest. Although the stereoscopic intensity level of the present embodiment has been described in an example where it is in a range of 0-3, the present invention is not limited to it; the present invention is applicable also to the case of any range of the level value.

To the stereoscopic intensity tag, an accumulated stereoscopic intensity threshold value is set which indicates a threshold value of an accumulated stereoscopic intensity obtained by accumulating stereoscopic intensity level values. As the accumulated stereoscopic intensity threshold value, an accumulated value is set which is not inflicted on the eyes of the user who views a stereoscopic-vision image any more.

The image control information of the present embodiment further contains a tag (warning level tag) that indicates a warning level of a stereoscopic intensity of a stereoscopic-vision image. It is to be noted that the warning level is set in accordance with a level value of a stereoscopic intensity.

A level value of the warning level is indicated in a range of 0-2, in which if the level value is 0, severity of warning is the lowest. If the level value is 2, on the other hand, the warning severity is the highest.

It is to be noted that the warning level value is set down in accordance with a level value of the stereoscopic intensity; for example, if the stereoscopic intensity level value is "0" or "1", the warning level value is "0", if the stereoscopic intensity level value is "2", the warning level value is "1", and if the stereoscopic intensity level value is "3", the warning level value is "2"; however, the present invention is not limited to such an example.

Figure 15:
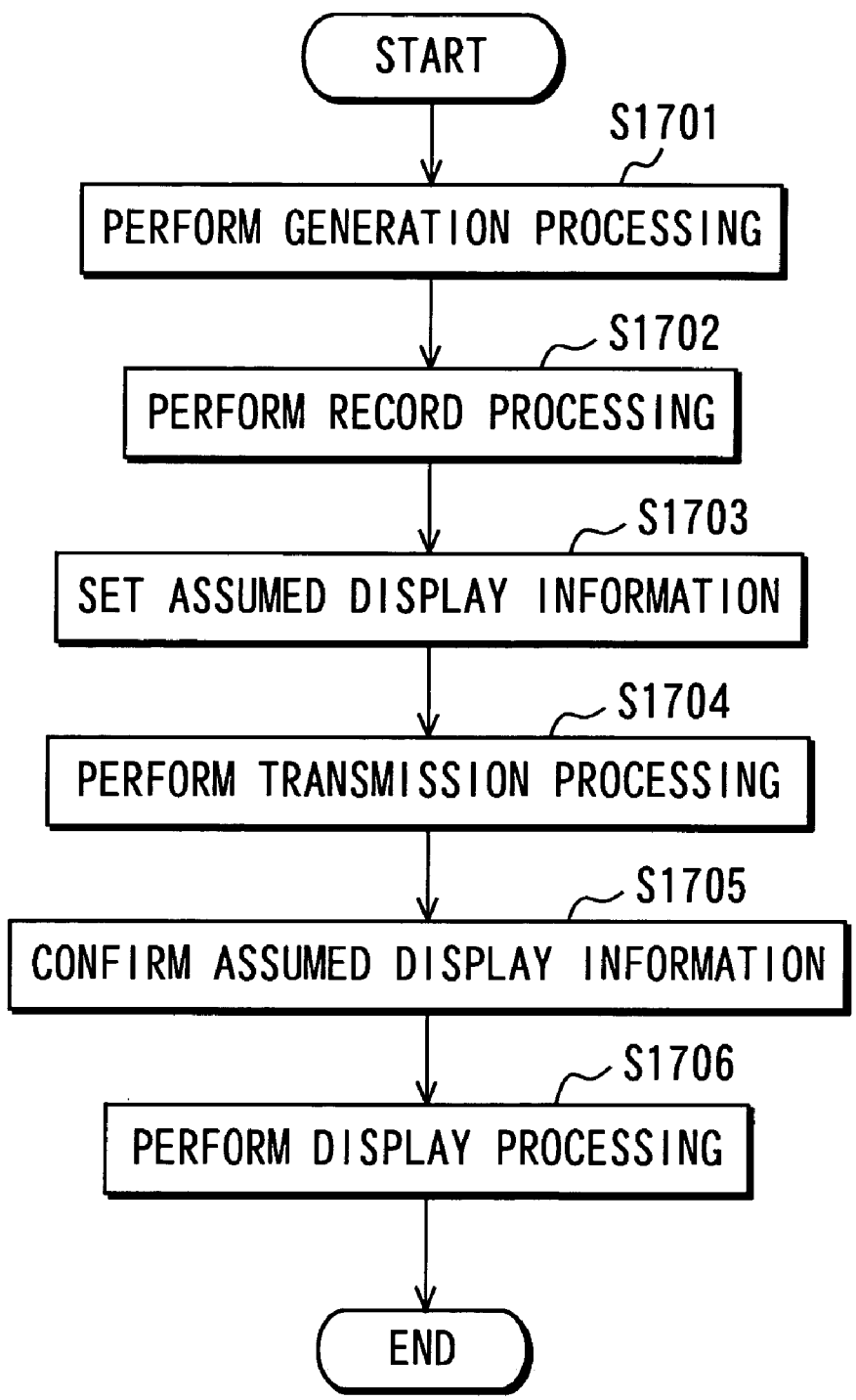
FIG. 15 is a flowchart showing an outline of processing to display a stereoscopic-vision image by utilizing assumed display information according to the present embodiment.

The following will describe stereoscopic-vision image display processing by use of assumed display information according to the present embodiment with reference to FIG. 15. FIG. 15 is a flowchart of an outline of processing to display a stereoscopic-vision image by utilizing assumed display information according to the present embodiment.

First, as shown in FIG. 15, when a subject is photographed by the imaging device 100, the composition section 131 in the imaging section 101 combines items of viewpoint image data (L-image data and R-image data) transmitted from the imaging device 130, to generate combined image data (S1701).

Furthermore, the imaging device 100 generates this viewpoint image data as well as image control information as information attached to this viewpoint image data. It is to be noted that the combined image data and the image control information are one suite of items of data required to generate stereoscopic-vision image data.

Next, the combined image data and the image control information are multiplied by the data multiplication section 134 and recorded in the recording medium 135 (S1702). Although the combined image data and the image control information are recorded in the same folder, the present invention is not limited to it; the combined image data and the image control information may be recorded in separate folders. It is to be noted that the recording medium 135 may be equipped to the imaging device 100 or to the computer device 150.

When the combined image data and the image control information are recorded in the recording medium 135 (S1702), a stereoscopic-vision image processing apparatus comprising the imaging device 100 and the computer device 150 can manage this combined image data and the image control information attached to it, while the user can view a stereoscopic-vision image that is composed on the basis of this combined image data and the image control information attached to it.

When the computer device 150 has read the specified combined image data and image control information out of the recording medium 135, the data separation section 136 separates it into the combined image data and the image control information and transmits them to the image decoding section 137 and the image separation section 138, respectively.

Figure 16A:
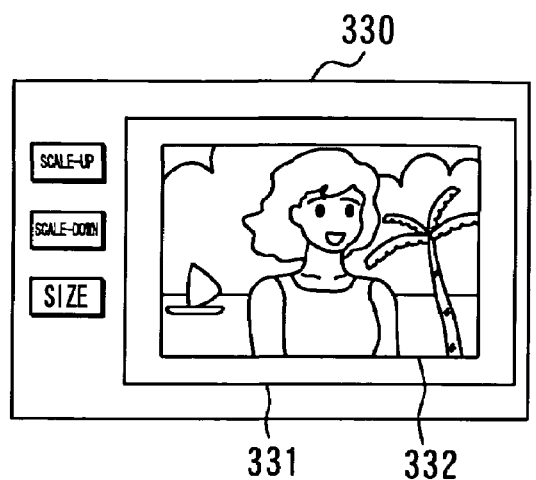
FIG. 16A is an explanatory illustration of a schematic configuration of a display screen example according to the present embodiment.

When the decoded combined image data and the image control information are transmitted to the image separation section 138 and converted into stereoscopic-vision image data by the image conversion section 139, as shown in FIG. 16A, a display screen 330 is displayed together with a stereoscopic-vision image 332 on the stereoscopic-vision display section 140 of the computer device 150. It is to be noted that the display screen 330 is smaller than a display screen 333 of FIG. 16B and displayed by, for example, the computer device 150 such as a portable terminal.

Figure 16B:
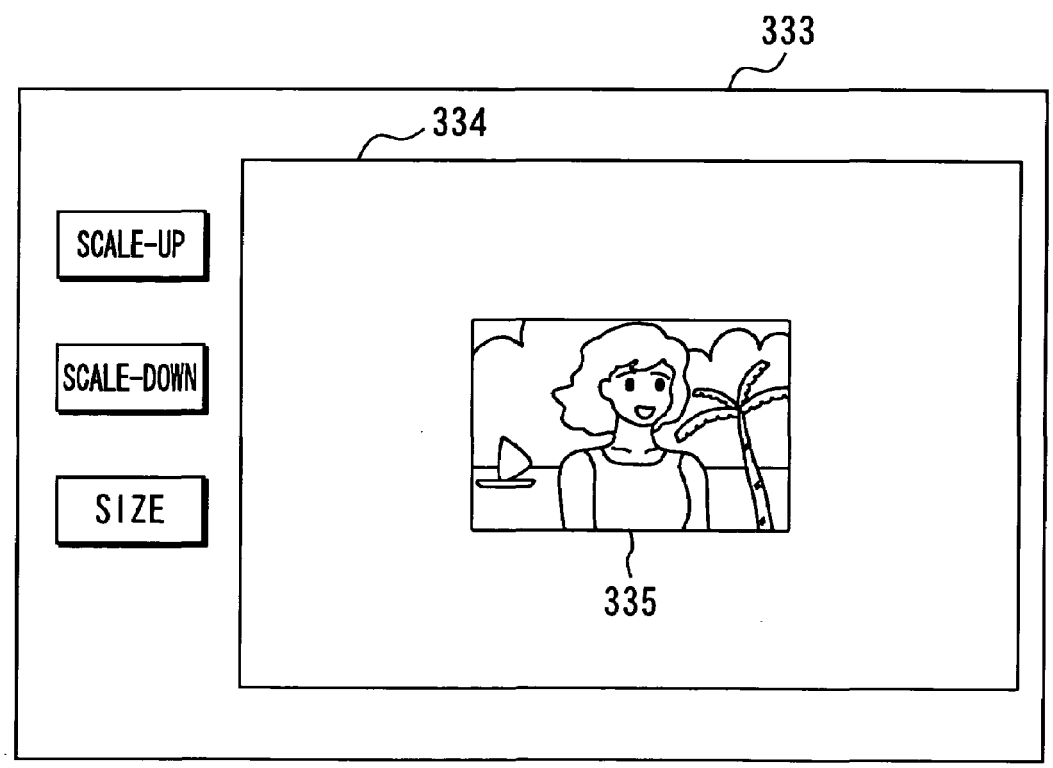
FIG. 16B is another explanatory illustration of another schematic configuration of the display screen example according to the present embodiment.

When a "SIZE" button to set an assumed display size shown in FIGS. 16A and 16B is pressed down using a mouse etc., a setting screen (not shown) for setting assumed display information is displayed. It is to be noted that, as necessary, edit processing such as cut-out is performed on a stereoscopic-vision image 332 to be displayed in an main area 331 in the display screen 330 so that it may match an assumed display size.

Further, besides processing to set an assumed display size on the above-described setting screen, for example, it may be set in accordance with specifications of the imaging device 100 or an assumed display size may be uniquely set beforehand or by corresponding-point matching. The setting processing will be described below.

When setting an assumed display size in accordance with the specifications of the imaging device 100, first a parallax amount (x) at infinity in the imaging device 100 is obtained. The parallax amount (x) at infinity is obtained by the following Equation 2:

$$\text{Parallax amount}(x) = \text{number of horizontal pixels}(h) \times \text{convergence angle}(i)/\text{view angle}(w) \quad \text{Equation 2}$$

The convergence angle refers to, for example, an angle between two lines combining a focal point and the two imaging devices 100. If the imaging devices 100 are parallel with each other, the convergence angle is 0 degree and a depth parallax is 0.

It is to be noted that a parallax amount (x) at infinity in the imaging device 100 according to the present embodiment is not limited to the case of two imaging devices but is applicable to, for example, a case of one imaging device mounting a four-mirror type adapter.

It is checked whether the obtained parallax amount (x) exceeds the distance between eyes of 65 mm; if it exceeds 65 mm, the obtained parallax amount is adjusted so as not to exceed 65 mm, so that based on an adjusted parallax amount, an assumed display size can be set.

Next, a display size of a stereoscopic-vision image is determined beforehand; if the imaging device 100 is designed in accordance with the above-described display size, an assumed display size is set down uniquely. Therefore, it is unnecessary to perform processing to set an assumed display size on the side of the user.

Furthermore, in a case where an assumed display size is set by matching corresponding points contained in each viewpoint image, first a target viewpoint image is selected to set an assumed display size, thereby extracting the corresponding points contained in each of the viewpoint images. These corresponding points may be extracted either by the user or automatically by the apparatus. Although the corresponding points to be extracted are three points, for example, in each viewpoint image, they are not limited to such a case.

Further, corresponding points refer to points of which correspondence is done between viewpoint images of the same subject on a one-to-one basis. For example, in the case of two viewpoints, corresponding points refer to points of which correspondence is done between a left viewpoint image and a right viewpoint image of the same subject on a one-to-one basis. It is to be noted that although ordinarily the corresponding points exist for almost all of points in each viewpoint image, the corresponding points are not always present in each of the viewpoint images. Therefore, a partial region having no corresponding point may occur in some cases.

It is to be noted that corresponding points related to the present embodiment may represent an aggregate of corresponding points present in a certain region in a viewpoint image. A size, a shape, etc. of a region occupied by the aggregate of corresponding points are not limited to such a case and may be arbitrary as far as a photographed subject can be correlated with each viewpoint image.

For example, in a case where a cup of the same subject is photographed in a plurality of viewpoint images, assuming the corresponding points to be present at an edge (or an arbitrary point at the edge) of an opening in the cup, a region occupied by the corresponding points present in an image of the edge of the opening photographed in one viewpoint image and a region occupied by the corresponding points present in an image of the edge of the opening photographed in another viewpoint image are the same as each other in size, shape, etc. almost to the same extent.

It is to be noted that to extract corresponding points, a contrast of each viewpoint image can be increased or each of the viewpoint images can be binarized to extract appropriate corresponding points efficiently. It is to be noted that image binarization refers to, for example, establishing one or more threshold values for luminosity (brightness) of each pixel of a viewpoint image so that the luminosity may be set to "0" (black) if it is less than the threshold value and to "1" (white) if it is above the threshold value.

When corresponding points are extracted, the relevant corresponding points are connected with each other for each viewpoint image to obtain a distance between the corresponding points. Further, by taking a difference of each of the obtained distances between the corresponding points, a parallax amount can be obtained. For example, in the case of two viewpoints, three pairs of corresponding points are extracted between the left viewpoint and right viewpoint images and each of the pairs of the corresponding points between the left viewpoint and right viewpoint images are connected to obtain three distances (A, B, and C) between the pairs of the corresponding points. Next, based on the obtained three distances between the corresponding points, absolute values of mutual differences (A-B, A-C, and B-C) are taken to obtain the respective parallax amount. It is to be noted that although the corresponding points are extracted from a remote peripheral portion having a large depth in the viewpoint, the present invention image is not limited to such a case.

Next, the largest one of the obtained parallax amount is selected and it is checked whether the largest parallax amount exceeds the eye distance of 65 mm. If the largest parallax amount does not exceed 65 mm, an assumed display size is obtained on the basis of this largest parallax amount automatically. If it exceeds 65 mm, on the other hand, the display size of each viewpoint image is adjusted so that the largest parallax amount may become less than 65 mm, to obtain an assumed display size based on a post-adjustment largest parallax amount.

In this case, if a type and a size of a display as well as an assumed display size indicating a display size of a stereoscopic-vision image to be displayed desirably are set on the above-described setting screen, the image separation section 138 sets the type and the size of the display and assumed display information comprised of the assumed display size in a field of "Assumed Display" contained in the image control information for the combined image data (S1703). This type of the display is, for example, "0" (portable terminal) shown in FIG. 14 and its size is "1 inch" etc.

It is to be noted that in addition to such a manner that assumed display information has been set through the setting screen as described above, the assumed display information may be set according to the present embodiment in a case of specifications of the imaging device, a case of which are set down uniquely, a case of corresponding-point matching or the like.

When the assumed display information, assumed display size information, etc. contained in the above-described image control information are set (S1703), the process transmits the above-described combined image data and the image control information via a network to other computer devices 150, a portable terminal (not shown), a cellular phone (not shown), etc. (S1704). By this transmission processing (S1704), it is possible to display a stereoscopic-vision image on an assumed display unit or an assumed size of the other computer devices etc. It is to be noted that the combined image data and the image control information of the present embodiment may be provided not exclusively by way of the network but by way of, for example, such a recording medium as a CD-ROM. The image control information in which the assumed display information is set and the combined image data are recorded in the recording medium 135. Therefore, for example, it is possible for any other computer device 150 such as a personal computer to read the above-described image control information and the combined image data.

Next, when having read the combined image data and the image control information recorded in the recording medium 135, the computer device 150 composes a stereoscopic-vision image by using viewpoint images contained in the combined image data and checks the assumed display information contained in the image control information prior to displaying it on the stereoscopic-vision display section 140 (S1705).

In check on the above-described assumed display information (S1705), it is confirmed whether the stereoscopic-vision display section 140 is such an assumed one as to be able to display a stereoscopic-vision image properly. For example, the process compares at least one of the assumed display size information and assumed display type information contained in the assumed display information to a display size (size of a display) of the stereoscopic-vision display section 140, to check whether it is an assumed display unit or not. If t is an assumed display unit, the process composes a stereoscopic-vision image of parallax images and displays it (S1706).

It is to be noted that this check (S1705) of the assumed display information according to the present embodiment is not limited to such a case; check of validity of the assumed display information may be also performed in accordance with the numbers of pixels of both the stereoscopic-vision display section 140 and the stereoscopic-vision image.

In the check on the assumed display information in accordance with these numbers of pixels, first the computer device 150 obtains the number of horizontal pixels per inch based on the number of horizontal pixels of the stereoscopic-vision display section 140 and a display size (inch) as given in Equation 3. It is to be noted that the number of horizontal pixels may be replaced with the number of vertical pixels, the number of pixels on the entire display screen, etc.

Number of horizontal pixels(h)×scale-up/down magnification(x)/display size(m)  Equation 3

Next, based on the number of horizontal pixels of the stereoscopic-vision image and an assumed display size set in the assumed display information, the computer device 150 obtains the number of horizontal pixels per inch of the stereoscopic-vision image as given in Equation 4. It is to be noted that if this assumed display size is not set, a warning indication etc. is displayed to the effect that the stereoscopic-vision image cannot be displayed. Further, as in the case of the stereoscopic-vision display section 140, the number of vertical pixels, the number of pixels of the entire display screen, etc. may be employed.

Number of horizontal pixels(h)×scale-up/down magnification (x)/assumed display size(s)  Equation 4

When the per-inch numbers of horizontal pixels of the stereoscopic-vision display section 140 and the stereoscopic-vision image are obtained respectively, they are compared to each other to decide whether it is possible to display this stereoscopic-vision image on the stereoscopic-vision display section 140.

For example, in a case where the number of horizontal pixels of the stereoscopic-vision display section 140 is 1024 (pixels) and the display size is 15 inches and also the number of horizontal pixels of the stereoscopic-vision image is 160 (pixels) and the assumed display size is two inches, in dot-correlated display not exposed to scale-up/down representation (x=1), the per-inch number of horizontal pixels of the stereoscopic-vision display unit is 68 (pixels) in accordance with the above Equation 3.

Next, the per-inch number of horizontal pixels of the stereoscopic-vision image is 80 (pixels) in accordance with Equation 4. The process compares a numeral (68) for a side of the stereoscopic-vision display section 140 and a numeral (80) for a side of the stereoscopic-vision image and, since they are nearly equal in magnification, decides that the stereoscopic-vision image can be displayed (S1705).

It is to be noted that there are some cases where the stereoscopic-vision image needs to be displayed in a scale-up/down representation not in dot-correlated representation on the stereoscopic-vision display section 140 because, for example, this image is smaller than a display size of the stereoscopic-vision display section 140. For example, in a case where the number of horizontal pixels of the stereoscopic-vision display section 140 is 1024 (pixels), the display size is 15 inches, the number of horizontal pixels of the stereoscopic-vision image is 160 (pixels), and the assumed display size is two inches, in the case of a magnification of scale-up/down display is three (x=3), the per-inch number of horizontal pixels of the stereoscopic-vision display section 140 becomes 68 (pixels) in accordance with Equation 3 and the per-inch number of horizontal pixels if the stereoscopic-vision image becomes 240 (pixels).

Based on a result of comparison between the per-inch number of horizontal pixels of the stereoscopic-vision display section 140 (68 pixels) and the per-inch number of horizontal pixels of the stereoscopic-vision image (240), it is decided that in dot-correlated display the image would expand greatly and the parallax would also expand so as to possibly exceed an eye distance of 65 mm beyond which the image may collapse, so that a warning dialog-box may appear on the stereoscopic-vision display section 140.

As described later, in the warning dialog-box a message is displayed to the effect that a stereoscopic-vision image difficult to view stereoscopically may be displayed if the stereoscopic-vision image is displayed, to prompt the user to select a "YES" button, a "NO" button, etc. in order to decide whether this stereoscopic-vision image should still be displayed or not.

Although if a result of the comparison indicates that, for example, the per-inch number of pixels of the stereoscopic-vision image is in a range from about "twice" to "three times" as many as the per-inch number of pixels of the stereoscopic-vision display section 140 counts, it is decided that the stereoscopic-vision image can be displayed, the present invention is not limited to such a case; the present invention can be applied also if it is set down in any other appropriate range.

Further, for example, if the number of horizontal pixels of the stereoscopic-vision display section 140 is 1024 (pixels), the display size is 15 inches, the number of horizontal pixels of the stereoscopic-vision image is 1280 (pixels), and the assumed display size is 100 inches, in dot-correlated display (x=1) the per-inch number of horizontal pixels of the stereoscopic-vision display section 140 becomes 68 (pixels) in accordance with the above Equation 3.

Next, the per-inch number of horizontal pixels of the stereoscopic-vision image becomes about 13 (pixels) in accordance with the above Equation 4. As a result of comparison between a numeral of 68 (pixels) for a side of the stereoscopic-vision display section 140 and a numeral of 13 (pixels) for a side of the stereoscopic-vision image, in dot-correlated display the display size of the stereoscopic-vision image is too small and a parallax is small, so that it is decided that it is difficult to display the image stereoscopically (S1705). Furthermore, a warning dialog-box appears to the effect that it is difficult to display the stereoscopic-vision image with a sufficient stereoscopic effect.

As described later, in the warning dialog-box, a message is displayed to the effect that the stereoscopic-vision image, if displayed, has little parallax and so cannot be given with a sufficient stereoscopic effect, to prompt the user to select the "YES" button, the "NO" button, etc. in order to decide whether this stereoscopic-vision image should still be displayed or not.

Although if a result of the comparison indicates that, for example, the per-inch number of pixels of the stereoscopic-vision image is in a range from about "⅓" to "½" as many as the per-inch number of pixels of the stereoscopic-vision display section 140 counts, it is decided that the stereoscopic-vision image can be displayed, the present invention is not limited to such a case; the present invention can be applied also if it is set down in any other appropriate range.

In the above embodiment, the display size of the stereoscopic-vision display section 140 is 15 inches and the assumed display size is 100 inches, so that in this condition it is impossible to display the stereoscopic-vision image in assumed display size on the stereoscopic-vision display section 140.

Therefore, for example, if the "YES" button is pressed on the warning dialog-box to display the stereoscopic-vision image or the like, the following processing is performed so that the stereoscopic-vision image may be displayed most properly in the display size of 15 inches of the stereoscopic-vision display section 140.

In a case where the number of horizontal pixels of the stereoscopic-vision display section 140 is 1024 (pixels), the display size is 15 inches, the number of horizontal pixels of the stereoscopic-vision image is 1280 (pixels), and the assumed display size is 100 inches, the per-inch number of horizontal pixels of the stereoscopic-vision display section 140 is 68 (pixels) in accordance with Equation 3.

Since the per-inch number of horizontal pixels of the stereoscopic-vision display section 140 is 68 (pixels), if a magnification of scale-up/down display is five (x=5), the per-inch number of horizontal pixels of the stereoscopic-vision image is 65 (pixels) and they are nearly equal to each other.

Based on a result of comparison between the per-inch number of horizontal pixels of the stereoscopic-vision display section 140 (68 pixels) and the per-inch number of horizontal pixels of the stereoscopic-vision image (65 pixels), it is decided that the per-inch number of horizontal pixels of the stereoscopic-vision image has become larger than that at the time of dot-correlated display so that they may be equal to each other and it has a parallax appropriate enough to be displayed stereoscopically (S1705).

Therefore, it is possible to display on the stereoscopic-vision display section 140 a stereoscopic-vision image adjusted so as to have an appropriate display size. Although the present embodiment has been described in an example where a stereoscopic-vision image having a small parallax is displayed as scaled up, the present invention is not limited to such a case; the present invention can be applied if, for example, a stereoscopic-vision image difficult to display stereoscopically is displayed as it is in dot-correlated representation.

Next, after processing to confirm the assumed display information (S1705), the process displays the stereoscopic-vision image on the stereoscopic-vision display section 140 (S1706).

The following will describe display processing to display a stereoscopic-vision image on the stereoscopic-vision display section 140. When displaying a stereoscopic-vision image if display size is changed from smaller one to larger one, for example, a size of a display to display the stereoscopic-vision image is expanded from two inches to 20 inches for a display type of "0" (portable terminal) through "4" (projector) shown in FIG. 14, such a stereoscopic-vision image is displayed as to have a display size set to an assumed display size, irrespective of the display size.

If the image control information containing the above-described assumed display information and the combined image data are read by the computer device 150 having a large display size (20 inches etc.) such as a personal computer, for example, the display screen 333 shown in FIG. 16B is displayed.

On the display screen 333 shown in FIG. 16B, a stereoscopic-vision image 335 is displayed. This stereoscopic-vision image 335 is displayed in a condition where it has almost the same size as that of the stereoscopic-vision image 332 shown in FIG. 16A.

The stereoscopic-vision image 335 is not displayed in a condition where it is expanded so as to match the display size of the display screen 333, because the display screen 333 is larger than a display size set in the image control information and, therefore, as described above, the stereoscopic-vision image 335 is exposed to dot-correlated display or converted to have a smaller size by the image conversion section 139 etc. based on the number of pixels and the assumed display size.

Therefore, by displaying a stereoscopic vision image whose parallax is set small beforehand so as not to be larger than the eye distance of 65 mm, it is possible to avoid inflicting a burden on the eyes. It is to be noted that the present invention is applicable not only when the stereoscopic-vision image 335 of the present embodiment is almost the same as that of the stereoscopic-vision image 332 but also when, for example, it is displayed in a size somewhat larger than the stereoscopic-vision image 332.

Further, to provide scaled-up display of the stereoscopic-vision image 335 shown in FIG. 16B, a "SCALE-UP" button is pressed by using the mouse etc. When the "SCALE-UP" button is pressed using the mouse etc., the display screen 333 switches to a warning dialog-box 310 to display a warning message as shown in FIG. 17.

As shown in FIG. 17, on the warning dialog-box 310, a warning message is displayed which says, for example, "Stereoscopic vision may possibly be difficult to provide". If the "YES" button is pressed, the expanded stereoscopic-vision image 335 appears on the display screen 333. If "NO" button is pressed, on the other hand, the process performs no expansion processing, to return to the original display screen 333.

This warning dialog-box 310 appears to notify that it is difficult to view the stereoscopic-vision image stereoscopically because it is expanded and so has a large parallax. Further, the expanded parallax causes a viewer to suffer from eyestrain.

When displaying the stereoscopic-vision image 335 in an entire region of a main area 334 shown in FIG. 16B and displaying the entire region of the stereoscopic-vision image 335 in the main area 331 on the display screen 330 shown in FIG. 16A, opposite to the above description, the "SCALE-DOWN" button etc. is pressed to reduce the image so that the stereoscopic-vision image 335 may entirely fall in the main area 331 shown in FIG. 16A, to display the stereoscopic-vision image 335 on the display screen 330. It is to be noted that when the "SCALE-DOWN" button is pressed, a warning dialog-box may appear to the effect that a stereoscopic-vision image having no stereoscopic effect owing to a small parallax is going to be displayed.

Although a display size of the stereoscopic-vision image 335 fluctuates in response to pressing of the "SCALE-UP" or "SCALE-DOWN" button according to the present embodiment, each time the display size fluctuates, a stereoscopic intensity may be obtained from a parallax of the post-fluctuation stereoscopic-vision image 335, to update a value of a stereoscopic intensity tag etc. included in the tags of the image control information. For example, if the stereoscopic intensity of the original stereoscopic-vision image 335 is "1", it is handled as being "2" when the 2) stereoscopic-vision image 335 is displayed in a condition where it is scaled up.

Further, each time the "SCALE-UP" or "SCALE-DOWN" button is pressed, the value of the stereoscopic intensity tag etc. included in the tags of the image control information may be updated. For example, when the "SCALE-UP" button is pressed, "1" may be added to the value of the stereoscopic intensity tag, and when the "SCALE-DOWN" button is pressed, "1" may be subtracted from the value of the stereoscopic intensity tag.

Figure 18:
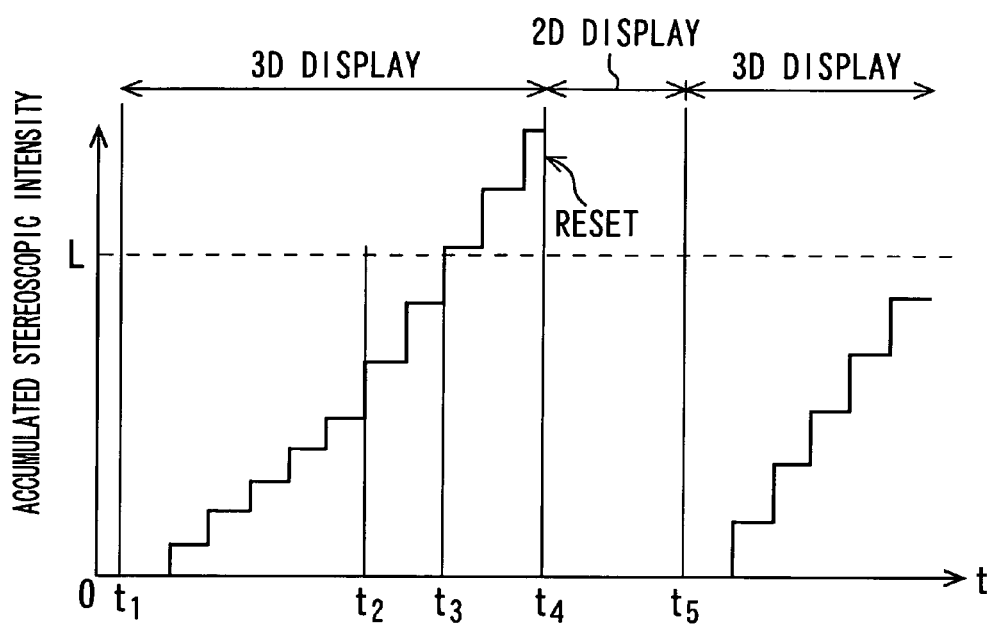
FIG. 18 is a graph showing an outline of a change in accumulated stereoscopic intensity of a stereoscopic-vision image according to the present embodiment.

The following will describe restriction on successive display of a stereoscopic-vision image according to the present embodiment, with reference to FIG. 18. FIG. 18 is a graph showing an outline of a change in accumulated stereoscopic intensity of a stereoscopic-vision image according to the present embodiment.

As shown in FIG. 18, a vertical axis of this accumulated stereoscopic intensity graph represents an accumulated stereoscopic intensity and a horizontal axis thereof represents a time (t). By successively displaying stereoscopic-vision images in this accumulated stereoscopic intensity graph, you can see how an accumulated stereoscopic intensity changes.

A threshold value of accumulated stereoscopic intensities is an accumulated stereoscopic intensity threshold value L shown in FIG. 18. Whether an accumulated stereoscopic intensity exceeds this accumulated stereoscopic intensity threshold value L provides one measure for deciding whether a 3D (3-dimensional) stereoscopic-vision image should be switched to a 2D (two-dimensional) image.

A symbol $t_1$ shown in FIG. 18 indicates a point of time when display of a stereoscopic-vision image on the stereoscopic-vision display section 140 starts. That is, at this point of time, the user starts to view a stereoscopic-vision image displayed on the stereoscopic-vision display section 140.

After display of a stereoscopic-vision image starts, for each lapse of time, for example, every second, the image conversion section 139 etc. serves to confirm whether the stereoscopic-vision image is displayed. If the stereoscopic-vision image is displayed, a level value of a stereoscopic intensity of the stereoscopic-vision image is added to an accumulated stereoscopic intensity. It is to be noted that at the time of display starting, the accumulated stereoscopic intensity is "0".

As shown in FIG. 18, from $t_1$ to $t_2$, each time a predetermined lapse of time elapses, a level value of the stereoscopic intensity is added to an accumulated stereoscopic intensity, so that as shown in FIG. 18 the accumulated stereoscopic intensity is increased stepwise as time elapses.

It is to be noted that if the level value of the stereoscopic intensity is constant, an incremental value added to the accumulated stereoscopic intensity is also constant.

Next, at $t_2$, since the level value of the stereoscopic intensity of a stereoscopic-vision image has fluctuated, so that an incremental value added to the accumulated stereoscopic intensity has been increased. That is, the user would view the stereoscopic-vision image having a further enhanced stereoscopic effect.

After $t_2$, a level value of the post-fluctuation stereoscopic intensity is added to the accumulated stereoscopic intensity each time the predetermined lapse of time elapses. If the thus increased accumulated stereoscopic intensity reaches the accumulated stereoscopic intensity threshold value L (at $t_3$), successive display restriction on the stereoscopic-vision image starts to be effective. This restriction is inflicted to avoid a burden from being inflicted on the user's eyes. It is to be noted that the accumulated stereoscopic intensity threshold value L can be changed so as to match, for example, a type and a display size of the stereoscopic-vision display section 140, a display size of the stereoscopic-vision image, etc.

When the successive display restriction on the stereoscopic-vision image starts to be effective, a warning dialog-box appears on the stereoscopic-vision display section 140 to the effect that "Further viewing of the stereoscopic-vision image may damage the human body". On this warning dialog-box, besides the message, a "2D" button is displayed to switch to a 2D image.

When this "2D" button is pressed by using an input section (not shown) such as a mouse, a stereoscopic-vision image displayed on the stereoscopic-vision display section 140 is switched to a 2D image. It is to be noted that up to a time when this "2D" button is pressed, each time the predetermined lapse of time elapses, a level value of the stereoscopic intensity continues to be added to the accumulated stereoscopic intensity so that the stereoscopic-vision image may be displayed continuously.

When the "2D" button is pressed ($t_4$), the stereoscopic-vision image is switched to a 2D image and the value of the accumulated stereoscopic intensity is also initialized to "0". It is to be noted that the accumulated stereoscopic intensity is initialized even when the display screen of the stereoscopic-vision display section 140 is turned off so that nothing may be displayed. It is to be noted that the above-described 2D image is not limited as far as it is a two-dimensional image, for example, each viewpoint image before being composed into the stereoscopic-vision image, a predetermined image, etc. can be displayed. Alternatively, rather than displaying the above-described 2D image, after a predetermined lapse of time elapses, display processing may be stopped to save on dissipation power.

When a predetermined lapse of time, for example, one minute elapses in a condition where the 2D image is displayed after the 2D image is switched from the stereoscopic-vision image, the stereoscopic-vision display section 140 displays a message to the effect that, for example, "3D stereoscopic-vision image can be displayed" as well as a "3D" button for switching from a 2D image to a stereoscopic-vision image.

When the above-described "3D" button is pressed by the input section such as a mouse etc., display of a stereoscopic-vision image starts ($t_5$), the 2D image is switched to a stereoscopic-vision image, which is displayed on the stereoscopic-vision display section 140 again. It is to Z be noted that after $t_5$, again, each time the predetermined lapse of time elapses, a level value of a stereoscopic intensity is added to the accumulated stereoscopic intensity.

Although the accumulated stereoscopic intensity according to the present embodiment has been described with reference to a case where a level value of a stereoscopic intensity is added to it each time the predetermined lapse of time elapses, the present invention is not limited to such a case; For example, during a time when a stereoscopic-vision image is displayed, the accumulated stereoscopic intensity may be kept to be given a constant increment always such as a proportional line-wise increment rather than a step-wise increment, for example.

Figure 19:
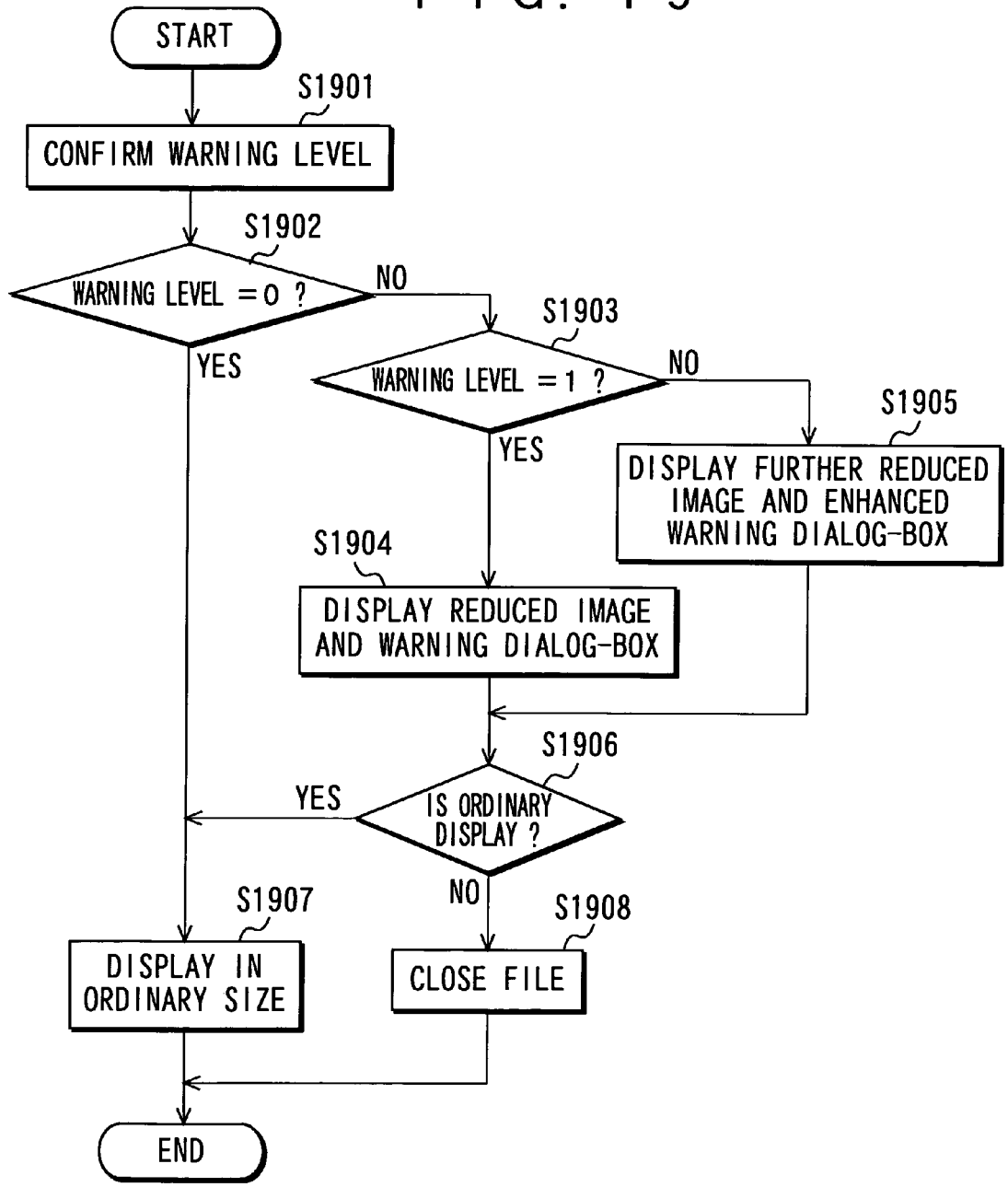
FIG. 19 is a flowchart showing an outline of warning dialog-box display processing based on a warning level according to the present embodiment.

The following will describe warning dialog-box display processing based on a warning level with reference to FIG. 19. FIG. 19 is a flowchart of an outline of the warning dialog-box display processing based on a warning level according to the present embodiment.

As shown in FIG. 19, besides the above-described warning dialog-box displayed on the basis of an accumulated stereoscopic intensity shown in FIG. 18, a warning dialog-box based on a warning level may be displayed. First, when displaying a stereoscopic-vision image on the stereoscopic-vision display section 140, it confirms a warning level based on a level value of a stereoscopic intensity (S1901).

If the warning level is "0" (S1902), the process decides that stereoscopic display is of no problem even if a stereoscopic-vision image is displayed, so that the stereoscopic-vision image can be displayed on the stereoscopic-vision display section 140 (S1907).

If the warning level is not "0" (S1902), on the other hand, the process confirms whether the warning level is "1".

If the warning level is "1" (S1903), a stereoscopic-vision image having a reduced display size and a warning dialog-box are displayed on the stereoscopic-vision display section 140 (S1904).

Figure 20:
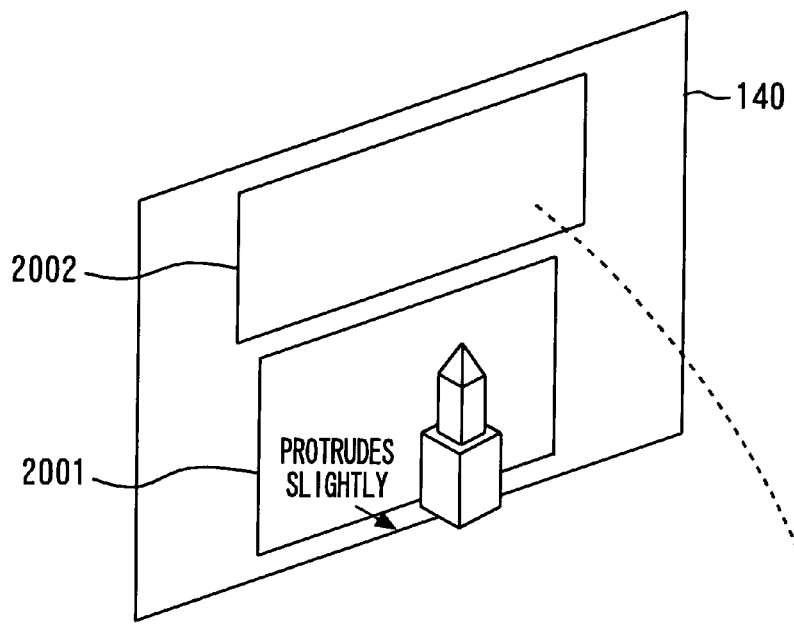
FIG. 20 is an explanatory illustration of an outline of a stereoscopic-vision image and a warning dialog-box which are displayed on the basis of a warning level according to the present embodiment.

As shown in FIG. 20, the stereoscopic-vision display section 140 comprises at least a region 2001 in which a stereoscopic-vision image having a lower stereoscopic effect than a stereoscopic-vision image having an assumed display size is displayed and a region 2002 in which a warning message to the effect that a stereoscopic effect is high is displayed. It is to be noted that FIG. 20 is an explanatory illustration of an outline of a stereoscopic-vision image and a warning dialog-box which are displayed on the basis of a warning level according to the present embodiment.

As described above, the warning level is "1" and so the user gets eyestrain, for example, so that the stereoscopic-vision image having a reduced parallax is displayed in the region 2001. Further, in the region 2002, a warning message as well as the "YES" and "NO" buttons are displayed.

As shown in FIG. 20, in a case where the user wants to display a stereoscopic-vision image on the stereoscopic-vision display section 140 ordinarily irrespective of the above-described warning level after confirming the above-described warning message, if the "YES" button is pressed by the input section such as a mouse, the process decides the display is ordinary (S1906), so that the stereoscopic-vision image is displayed as it is on the stereoscopic-vision display section 140 (S1907).

Oppositely, in a case where the user does not want to display a stereoscopic-vision image as it is on the stereoscopic-vision display section 140 in response to the above-described warning message after confirming it (S1906), this stereoscopic-vision image is not displayed (S1908).

Next, as shown in FIG. 19, if the warning level is not "1" (S1903), the stereoscopic-vision image having a further reduced display size and a warning dialog-box are displayed on the stereoscopic-vision display section 140 (S1905).

Figure 21:
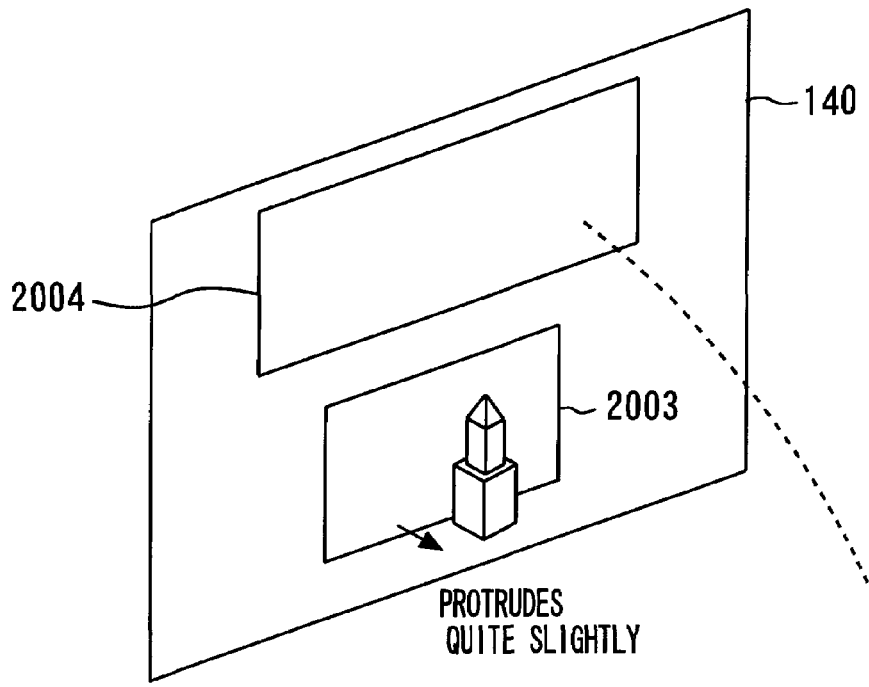
FIG. 21 is another explanatory illustration of the outline of another stereoscopic-vision image and another warning dialog-box which are displayed on the basis of another warning level according to the present embodiment.

As shown in FIG. 21, the stereoscopic-vision display section 140 comprises at least a region 2003 in which a stereoscopic-vision image having a further smaller parallax and a further lower stereoscopic effect than a stereoscopic-vision image shown in FIG. 20 is displayed and a region 2004 in which a warning message to the effect that a stereoscopic effect is very high is displayed. It is to be noted that FIG. 21 is an explanatory illustration of an outline of another stereoscopic-vision image and another warning dialog-box which are displayed on the basis of a warning level according to the present embodiment.

As described above, the warning level is "1" and so the user gets eyestrain very likely, for example, so that the stereoscopic-vision image having a much reduced display size is displayed in the region 2003. Further, in the region 2004, a warning message as well as the "YES" and "NO" buttons are displayed.

As shown in FIG. 21, in a case where the user wants to display a stereoscopic-vision image on the stereoscopic-vision display section 140 ordinarily irrespective of the above-described warning level after confirming the above-described warning message, if the "YES" button is pressed by the input section such as a mouse, the process decide the display is ordinary (S1906), so that the stereoscopic-vision image is displayed as it is on the stereoscopic-vision display section 140 (S1907).

Oppositely, in a case where the user does not want to display a stereoscopic-vision image on the stereoscopic-vision display section 140 after confirming the above-described warning message (S1906), this stereoscopic-vision image is not displayed (S1908).

Although a stereoscopic-vision image of the present embodiment has been described with reference to a case where an image file of the stereoscopic-vision image is closed if the stereoscopic-vision image is not displayed on the stereoscopic-vision display section 140 after a warning dialog-box is displayed, the present invention is not limited to such a case; for example, the present invention is applicable also to a case where the stereoscopic-vision image may be displayed by, for example, reducing its parallax appropriately.

Figure 22A:
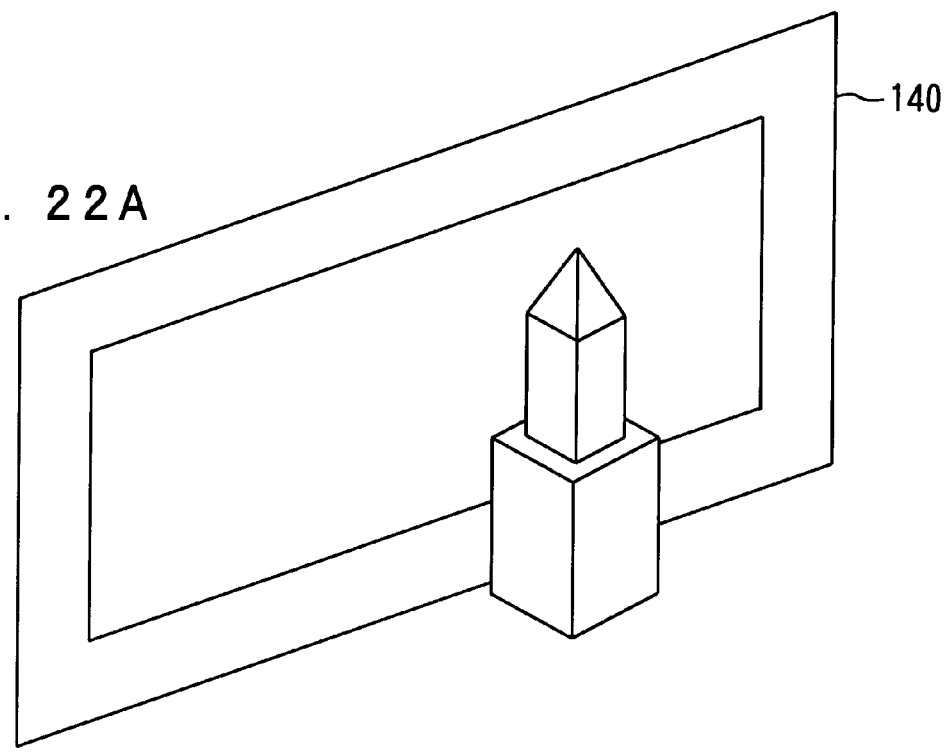
FIG. 22A is an explanatory illustration of an outline of a screen of a stereoscopic image which is displayed on the basis of a warning level according to the present embodiment.
Figure 22B:
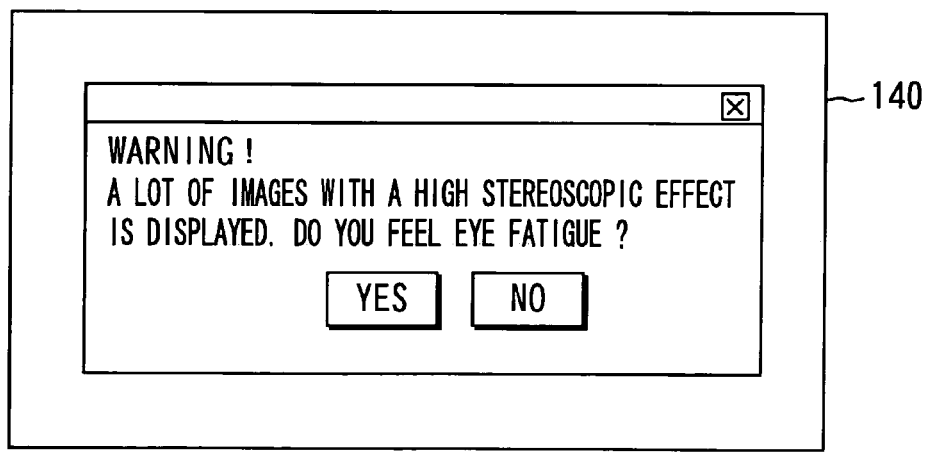
FIG. 22B is an explanatory illustration of an outline of a warning dialog-box which is displayed on the basis of a warning level according to the present embodiment.

Although a warning dialog-box of the present embodiment has been described with reference to a case where it is displayed together with a stereoscopic-vision image on one screen, the present invention is not limited to such a case; for example, the present invention is applicable also to a case where only a stereoscopic-vision image having an assumed display size is displayed on the stereoscopic-vision display section 140 as shown in FIG. 22A and a warning dialog-box is displayed, for example, on a screen separate from that on which the stereoscopic-vision image is displayed, as shown in FIG. 22B.

When the "YES" button shown in FIG. 22B is pressed, the process decides that the display is ordinary (S1906), so that the stereoscopic-vision image is displayed as it is on the stereoscopic-vision display section 140 (S1907).

Oppositely, in a case where the user does not want to display a stereoscopic-vision image ordinarily on the stereoscopic-vision display section 140 after confirming the above-described warning message (S1906), the image file of this stereoscopic-vision image is not displayed (S1908). It is to be noted that FIGS. 22A and 22B are explanatory illustrations of outlines of a stereoscopic image screen and a warning dialog-box which are displayed on the basis of a warning level according to the present embodiment, respectively.

If a warning dialog-box based on an accumulated stereoscopic intensity is displayed earlier or if a warning dialog-box based on scale-up/down of a stereoscopic-vision image is displayed earlier, a warning dialog-box which is displayed on the basis of a warning level according to the present embodiment is not displayed successively but displayed with a time interval of, for example, one minute.

Although any one of a warning dialog-box which is displayed on the basis of a warning level according to the present embodiment, a warning dialog-box based on an accumulated stereoscopic intensity according to the present embodiment, and a warning dialog-box based on expansion etc. of a parallax of a stereoscopic-vision image according to the present embodiment is displayed only once by restrictions for each stereoscopic-vision image which is displayed, the present invention is not limited to such a case.

The present invention is applicable also to a case where a warning dialog-box which is displayed on the basis of a warning level of the present embodiment may be displayed each time the warning level is checked or only once, a case where the warning dialog-box is displayed when such a stereoscopic-vision image that the warning level corresponds to "1" or "2" is displayed a predetermined number of times, for example, 20 times, etc.

It is possible to produce the contents by containing assumed display information in image control information attached to the contents such as the viewpoint image to thereby assume a stereoscopic-vision display section 140 on which the image is desired to be displayed and further, to search for the desired contents efficiently by providing list display etc. of a correlated relationship between the contents adapted to be displayed on the stereoscopic-vision display section 140 and the assumed display information, an assumed display size, etc. based on the attached assumed display information.

Although the preferred embodiments of the present embodiment have been described with reference to the appended drawings, the present invention is not limited to them. It is appreciated that obviously, any and all modifications and variations which may occur to those skilled in the art should be considered to be within the scope of the present invention as defined in the appended claims.

Although the above embodiment has been described with reference to the embodiment of two viewpoint images, the present invention is not limited to such a case. For example, the present invention is applicable also to the case of three or more viewpoint images.

As described above, by the present invention, it is possible to specify a type and a display size of an assumed display unit on which a composed stereoscopic-vision image is to be displayed and a display size of the stereoscopic-vision image, thereby managing this specified information as accessory information together with a viewpoint image. Further, when a stereoscopic-vision image is to be displayed, if a type or a display size is different from that of an assumed display unit, it is warned of or the stereoscopic-vision image is scaled-up/down so that a natural stereoscopic-vision image can be obtained which is expressed with a parallax between the viewpoint images in an appropriate range.

INDUSTRIAL APPLICABILITY

The present invention can be applied to a stereoscopic-vision image processing apparatus, a stereoscopic-vision image providing method, and an image display method etc. that are capable of generating a stereoscopic-vision image to be viewed stereoscopically.

The invention claimed is:

1. A stereoscopic-vision image processing apparatus for generating a stereoscopic-vision image, the image processing apparatus comprising:
   a first memory region to store actual display information describing at least a size of a display area of a display unit in which the stereoscopic-vision image is to be displayed;
   a second memory region to store a plurality of viewpoint images having a parallax with respect to each other and assumed display information about an assumed display unit on which the stereoscopic-vision image was desired to be displayed when generated, the assumed display information comprises an assumed display size and/or assumed display type of the assumed display unit; and
   at least one control circuit adapted to compare the actual display information and the assumed display information and determine whether the stereoscopic-vision image can be generated properly when the plurality of viewpoint images are displayed on the display unit.

2. The stereoscopic-vision image processing apparatus according to claim 1, wherein a display size of the stereoscopic-vision image is controlled by the at least one control circuit based on at least the assumed display information.

3. The stereoscopic-vision image processing apparatus according to claim 2, wherein the assumed display information is assumed display size information.

4. The stereoscopic-vision image processing apparatus according to claim 1, wherein when a display size of the stereoscopic-vision image is changed to a new display size, the at least one control circuit compares the assumed display information to the new display size to determine whether the stereoscopic-vision image can be displayed properly and a screen for informing the change in display size is displayed.

5. The stereoscopic-vision image processing apparatus according to claim 1, wherein if the at least one control circuit determines that the stereoscopic-vision image cannot be displayed properly, a warning dialog-box is displayed instructing a viewer of the display unit of that determination.

6. The stereoscopic-vision image processing apparatus according to claim 5, wherein the at least one control circuit determines whether the warning dialog-box is to be displayed based in part on a display lapse of time when the stereoscopic-vision image is displayed.

7. The stereoscopic-vision image processing apparatus according to claim 6, wherein the at least one control circuit determines whether the warning dialog-box is to be displayed based in pan on an. accumulated value of a stereoscopic intensity of the stereoscopic-vision image that is accumulated over the display lapse of time when the stereoscopic-vision image is displayed.

8. The stereoscopic-vision image processing apparatus according to claim 5, wherein the at least one control circuit determines whether the warning dialog-box is to be displayed based in part on assumed display size information contained in the assumed display information.

9. The stereoscopic-vision image processing apparatus according to claim 5, wherein the at least one control circuit determines whether to display the warning dialog-box in response to expansion and/or reduction of a display size of the stereoscopic-vision image.

10. The stereoscopic-vision image processing apparatus according to claim 8, wherein the at least one control circuit determines whether to display the warning dialog-box in response to expansion and/or reduction of the display size of the stereoscopic-vision image.

11. The stereoscopic-vision image processing apparatus according to claim 8, wherein the at least one control circuit determines whether to display the warning dialog-box based in part on a stereoscopic intensity of the stereoscopic-vision image and/or a display lapse of time of the stereoscopic-vision image.

12. The stereoscopic-vision image processing apparatus according to claim 8, wherein the at least one control circuit determines whether to display the warning dialog-box based in part on an accumulated value of the stereoscopic intensity.

13. The stereoscopic-vision image processing apparatus according to claim 1, wherein the stereoscopic-vision image is composed of a right-viewpoint image and a left-viewpoint image having a parallax with respect to each other 14. The stereoscopic-vision image processing apparatus according to claim 13, wherein the right-viewpoint image and the left-viewpoint image are managed as one combined image and the assumed display information is managed as tag information of the combined image.

15. The stereoscopic-vision image processing apparatus of claim 1, wherein the control circuit determines whether the stereoscopic-vision image can be displayed properly in part by determining whether the stereoscopic-vision image can be displayed with a parallax within a threshold parallax tolerance.

16. An image display method for generating a stereoscopic-vision image, the method comprising:
    comparing actual display information for a first display unit on which the stereoscopic-vision image is to be displayed, the actual display information describing at least an actual size of the first display unit, and assumed display information for the stereoscopic-vision image, the stereoscopic-vision image comprising a plurality of viewpoint images at least having a parallax with respect to each other and the assumed display information describing at least an assumed size of a second display unit on which the stereoscopic-vision image, when created, was intended to be displayed;
    determining, based on the comparing, whether the stereoscopic-vision image can be displayed on the first display unit with a parallax within a threshold parallax tolerance; and
    if the stereoscopic-vision image can be displayed with a parallax within the threshold parallax tolerance, displaying the stereoscopic-vision image, and otherwise displaying a warning message informing a viewer of the first display unit that the stereoscopic-vision image may not be displayed properly.

17. The image display method according to claim 16, further comprising:
    if the actual size of the stereoscopic-vision image is changed to a new display size, repeating the acts of evaluating and determining with the new display size and only continuing to display the stereoscopic-vision image if the stereoscopic-vision image can still be display with a parallax within the threshold parallax tolerance.

18. The image display method according to claim 17, wherein a warning dialog-box is displayed in response to expansion and/or reduction of a display size of the stereoscopic-vision image.

19. The image display method of claim 16, further comprising:
    if the warning message is displayed to the viewer, prompting the viewer for whether the stereoscopic-vision image should be displayed with a parallax outside the threshold parallax tolerance and, if so, displaying the stereoscopic-vision image.

20. The image display method of claim 16, further comprising:
    receiving data describing the stereoscopic-vision image in a single data structure, the single data structure comprising data describing the plurality of viewpoint images and the assumed display information.

21. The image display method of claim 16, wherein the actual display information comprises information on a type of the first display unit and the assumed display information comprises information on a type of the second display unit.

22. The image display method of claim 16, wherein comparing the actual display size and the assumed display size comprises determining whether the actual display size is within a threshold similarity to the assumed display size.

* * * * *